US008391256B2

(12) United States Patent
Beach

(10) Patent No.: US 8,391,256 B2
(45) Date of Patent: *Mar. 5, 2013

(54) RF PORT FOR MULTIPLE WIRELESS LOCAL AREA NETWORKS

(75) Inventor: Robert Beach, Los Altos, CA (US)

(73) Assignee: Symbol Technologies, Inc., Holtsville, NY (US)

(*) Notice: Subject to any disclaimer, the term of this patent is extended or adjusted under 35 U.S.C. 154(b) by 692 days.

This patent is subject to a terminal disclaimer.

(21) Appl. No.: 11/622,074

(22) Filed: Jan. 11, 2007

(65) Prior Publication Data
US 2007/0171883 A1   Jul. 26, 2007

Related U.S. Application Data

(63) Continuation of application No. 09/780,741, filed on Feb. 9, 2001, now Pat. No. 7,173,922, which is a continuation-in-part of application No. 09/528,697, filed on Mar. 17, 2000, now abandoned.

(51) Int. Cl.
*H04W 4/00* (2009.01)

(52) U.S. Cl. ........ 370/338; 370/328; 370/334; 370/339; 370/343; 370/466; 370/469; 370/491; 370/492; 455/41.2; 455/41.3; 455/422.1; 455/430

(58) Field of Classification Search .................. None
See application file for complete search history.

(56) References Cited

U.S. PATENT DOCUMENTS

| | | | |
|---|---|---|---|
| 4,519,068 A | 5/1985 | Krebs et al. | |
| 5,046,082 A | 9/1991 | Zicker et al. | |
| 5,239,673 A | 8/1993 | Natarajan | |
| 5,339,316 A | 8/1994 | Diepstraten | |
| 5,371,738 A | 12/1994 | Moelard et al. | |
| 5,406,561 A | 4/1995 | Arai | |
| 5,432,814 A | 7/1995 | Hasegawa | |
| 5,457,557 A | 10/1995 | Zarem | |
| 5,461,627 A | 10/1995 | Rypinski | |
| 5,465,392 A | 11/1995 | Baptist et al. | |
| 5,490,139 A | 2/1996 | Baker | |
| 5,502,726 A | 3/1996 | Fischer | |
| 5,504,746 A | 4/1996 | Meier | |
| 5,506,887 A | 4/1996 | Emery | |
| 5,509,027 A | 4/1996 | Vook et al. | |
| 5,533,026 A | 7/1996 | Ahmadi et al. | |
| 5,546,397 A | 8/1996 | Mahany | |
| 5,602,843 A | 2/1997 | Gray | |
| 5,610,972 A | 3/1997 | Emery | |
| 5,610,973 A | 3/1997 | Comer | |
| 5,623,495 A | 4/1997 | Eng | |

(Continued)

FOREIGN PATENT DOCUMENTS

EP   0566874   10/1993
EP   597640 A1   5/1994

(Continued)

OTHER PUBLICATIONS

IEEE 802.11, Part 11: Wireless LAN Medium Access Control (MAC) and Physical Layer (PHY) specifications, Jun. 26, 1997.*

(Continued)

*Primary Examiner* — Faruk Hamza
*Assistant Examiner* — Aixa A Guadalupe

(57) ABSTRACT

A wireless local area network is provided with simplified RF ports which are configured to provide lower level media access control functions. Higher level media access control functions are provided in a cell controller, which may service one or more RF ports that are capable operating with at least two wireless local area subnetworks. Mobile units can also be configured with the higher level media access control functions being performed in a host processor.

46 Claims, 7 Drawing Sheets

U.S. PATENT DOCUMENTS

| | | | |
|---|---|---|---|
| 5,636,220 A | 6/1997 | Vook | |
| 5,668,803 A | 9/1997 | Tymes et al. | |
| 5,717,737 A | 2/1998 | Doviak | |
| 5,724,346 A | 3/1998 | Kobayashi et al. | |
| 5,734,643 A | 3/1998 | Rondeau | |
| 5,734,963 A | 3/1998 | Fitzgerald | |
| 5,737,328 A | 4/1998 | Norman et al. | |
| 5,758,281 A | 5/1998 | Emery | |
| 5,761,619 A | 6/1998 | Danne et al. | |
| 5,765,112 A | 6/1998 | Fitzgerald | |
| 5,768,531 A | 6/1998 | Lin | |
| 5,771,353 A | 6/1998 | Eggleston et al. | |
| 5,787,077 A * | 7/1998 | Kuehnel et al. | 370/331 |
| 5,790,536 A | 8/1998 | Mahany et al. | |
| 5,794,153 A | 8/1998 | Ariyavisitakul et al. | |
| 5,796,729 A | 8/1998 | Greaney | |
| 5,835,696 A | 11/1998 | Hess | |
| 5,850,526 A | 12/1998 | Chou | |
| 5,852,405 A | 12/1998 | Yoneda et al. | |
| 5,870,385 A | 2/1999 | Ahmadi et al. | |
| 5,873,085 A | 2/1999 | Enoki et al. | |
| 5,875,186 A | 2/1999 | Belanger | |
| 5,881,094 A | 3/1999 | Schilling | |
| 5,887,256 A | 3/1999 | Lu et al. | |
| 5,889,816 A | 3/1999 | Agrawal | |
| 5,898,679 A | 4/1999 | Brederveld et al. | |
| 5,901,362 A | 5/1999 | Cheung | |
| 5,907,544 A | 5/1999 | Rypinski | |
| 5,912,885 A | 6/1999 | Mitts et al. | |
| 5,918,181 A | 6/1999 | Foster | |
| 5,926,463 A | 7/1999 | Ahearn et al. | |
| 5,946,617 A | 8/1999 | Portaro et al. | |
| 5,946,628 A | 8/1999 | Veloso et al. | |
| 5,958,006 A | 9/1999 | Eggleston et al. | |
| 5,960,344 A | 9/1999 | Mahany | |
| 5,964,815 A | 10/1999 | Wallace et al. | |
| 5,974,034 A | 10/1999 | Chin | |
| 5,987,521 A | 11/1999 | Arrowood et al. | |
| 5,991,287 A | 11/1999 | Diepstraten | |
| 5,999,295 A | 12/1999 | Vowell | |
| 6,005,884 A | 12/1999 | Cook | |
| 6,006,090 A | 12/1999 | Coleman et al. | |
| 6,011,975 A | 1/2000 | Emery | |
| H001836 H | 2/2000 | Fletcher et al. | |
| 6,029,064 A | 2/2000 | Farris et al. | |
| 6,031,863 A | 2/2000 | Jusa et al. | |
| 6,064,887 A | 5/2000 | Kallioniemi et al. | |
| 6,067,291 A | 5/2000 | Kamerman et al. | |
| 6,067,297 A | 5/2000 | Beach | |
| 6,088,346 A | 7/2000 | Du | |
| 6,101,531 A | 8/2000 | Eggleston et al. | |
| 6,119,162 A | 9/2000 | Li et al. | |
| 6,137,797 A | 10/2000 | Bass et al. | |
| 6,140,911 A | 10/2000 | Fisher et al. | |
| 6,154,461 A | 11/2000 | Stumiolo et al. | |
| 6,205,495 B1 | 3/2001 | Gilbert et al. | |
| 6,213,942 B1 | 4/2001 | Flach et al. | |
| 6,233,626 B1 | 5/2001 | Swales et al. | |
| 6,259,898 B1 | 7/2001 | Lewis | |
| 6,272,120 B1 | 8/2001 | Alexander | |
| 6,301,618 B1 | 10/2001 | Sitaraman et al. | |
| 6,330,231 B1 | 12/2001 | Bi | |
| 6,330,244 B1 | 12/2001 | Swartz et al. | |
| 6,353,599 B1 | 3/2002 | Bi et al. | |
| 6,359,873 B1 | 3/2002 | Kobayashi | |
| 6,393,261 B1 | 5/2002 | Lewis | |
| 6,400,722 B1 | 6/2002 | Chuah et al. | |
| 6,414,950 B1 | 7/2002 | Rai et al. | |
| 6,415,323 B1 | 7/2002 | McCanne et al. | |
| 6,421,714 B1 | 7/2002 | Rai et al. | |
| 6,459,700 B1 | 10/2002 | Hoang | |
| 6,473,449 B1 | 10/2002 | Cafarella et al. | |
| 6,480,480 B1 | 11/2002 | Du | |
| 6,487,605 B1 | 11/2002 | Leung | |
| 6,496,499 B1 | 12/2002 | Hamilton | |
| 6,496,881 B1 | 12/2002 | Green | |
| 6,501,955 B1 | 12/2002 | Durrant et al. | |
| 6,512,754 B2 | 1/2003 | Feder et al. | |
| 6,522,881 B1 | 2/2003 | Feder et al. | |
| 6,590,884 B1 | 7/2003 | Panasik | |
| 6,590,885 B1 | 7/2003 | Jorgensen | |
| 6,600,734 B1 | 7/2003 | Gernert et al. | |
| 6,629,151 B1 | 9/2003 | Bahl | |
| 6,651,105 B1 | 11/2003 | Bhagwat et al. | |
| 6,654,382 B1 | 11/2003 | Bare et al. | |
| 6,665,536 B1 * | 12/2003 | Mahany | 455/432.1 |
| 6,665,718 B1 | 12/2003 | Chuah et al. | |
| 6,681,259 B1 | 1/2004 | Lemilainen et al. | |
| 6,683,866 B1 | 1/2004 | Stanwood et al. | |
| 6,701,361 B1 | 3/2004 | Meier | |
| 6,714,987 B1 | 3/2004 | Amin et al. | |
| 6,717,926 B1 | 4/2004 | Deboille | |
| 6,724,730 B1 | 4/2004 | Mlinarsky et al. | |
| 6,751,250 B2 | 6/2004 | Kirke et al. | |
| 6,751,417 B1 | 6/2004 | Combs et al. | |
| 6,760,859 B1 | 7/2004 | Kim et al. | |
| 6,785,556 B2 | 8/2004 | Souissi | |
| 6,795,406 B2 | 9/2004 | Kikinis | |
| 6,795,857 B1 | 9/2004 | Leung et al. | |
| 6,796,406 B1 | 9/2004 | Yunes | |
| 6,810,520 B2 * | 10/2004 | Lu et al. | 719/310 |
| 6,847,620 B1 | 1/2005 | Meier | |
| 6,859,134 B1 | 2/2005 | Heiman et al. | |
| 6,873,620 B1 | 3/2005 | Coveley et al. | |
| 6,901,259 B2 | 5/2005 | Dorenbosch | |
| 6,920,125 B1 | 7/2005 | Wu | |
| 6,947,408 B1 | 9/2005 | Liberti et al. | |
| 7,024,222 B2 | 4/2006 | Gorsuch | |
| 7,025,209 B2 | 4/2006 | Hawkins | |
| 7,054,636 B1 | 5/2006 | Howe | |
| 7,113,498 B2 | 9/2006 | Bajic | |
| 7,120,608 B1 | 10/2006 | Gallagher et al. | |
| 7,149,193 B2 | 12/2006 | Fong et al. | |
| 7,173,922 B2 | 2/2007 | Beach | |
| 7,173,923 B2 | 2/2007 | Beach | |
| 7,221,651 B2 | 5/2007 | Mizoguchi | |
| 7,245,603 B1 | 7/2007 | Lucidarme et al. | |
| 7,376,079 B2 | 5/2008 | Klein | |
| 7,428,575 B1 | 9/2008 | Motoyama | |
| 2001/0022784 A1 | 9/2001 | Menon et al. | |
| 2001/0055283 A1 | 12/2001 | Beach | |
| 2002/0015398 A1 | 2/2002 | Kikinis | |
| 2002/0034168 A1 | 3/2002 | Swartz | |
| 2002/0075844 A1 | 6/2002 | Hagen | |
| 2002/0089958 A1 | 7/2002 | Feder et al. | |
| 2002/0097560 A1 | 7/2002 | Carr | |
| 2002/0099972 A1 | 7/2002 | Walsh et al. | |
| 2002/0147008 A1 | 10/2002 | Kallio | |
| 2002/0181429 A1 | 12/2002 | Kikinis | |
| 2002/0184387 A1 | 12/2002 | Yamaya et al. | |
| 2002/0196763 A1 | 12/2002 | Reynolds et al. | |
| 2002/0197984 A1 | 12/2002 | Monin | |
| 2003/0012164 A1 | 1/2003 | Mizoguchi et al. | |
| 2003/0067917 A1 | 4/2003 | Morrison et al. | |
| 2003/0101131 A1 | 5/2003 | Warren et al. | |
| 2003/0105865 A1 | 6/2003 | McCanne et al. | |
| 2003/0112820 A1 | 6/2003 | Beach | |
| 2003/0193946 A1 | 10/2003 | Gernert | |
| 2004/0022222 A1 | 2/2004 | Clisham | |
| 2004/0029612 A1 | 2/2004 | Gorsuch | |
| 2004/0052248 A1 | 3/2004 | Frank et al. | |
| 2004/0110506 A1 | 6/2004 | Dent | |
| 2004/0122700 A1 | 6/2004 | Aoki et al. | |
| 2004/0152482 A1 | 8/2004 | Raffel et al. | |
| 2004/0165550 A1 | 8/2004 | Beach | |
| 2005/0028032 A1 | 2/2005 | Klein | |
| 2005/0058087 A1 | 3/2005 | Beach | |
| 2005/0157690 A1 | 7/2005 | Frank et al. | |
| 2005/0226181 A1 | 10/2005 | Beach | |
| 2006/0190586 A1 | 8/2006 | Stewart et al. | |
| 2007/0038759 A1 | 2/2007 | Hanson et al. | |
| 2007/0109993 A1 | 5/2007 | Beach | |
| 2007/0109994 A1 | 5/2007 | Beach | |
| 2007/0177435 A1 | 8/2007 | Beach | |
| 2007/0177561 A1 | 8/2007 | Beach | |

FOREIGN PATENT DOCUMENTS

| | | |
|---|---|---|
| EP | 0696117 | 2/1996 |
| EP | 789468 A1 | 8/1997 |
| EP | 0817096 | 1/1998 |
| EP | 917318 A2 | 5/1999 |
| EP | 917320 A2 | 5/1999 |
| EP | 930766 A2 | 7/1999 |
| EP | 1098490 A2 | 5/2001 |
| EP | 1134935 A1 | 9/2001 |
| GB | 2320647 | 6/1998 |
| JP | H5336127 | 12/1993 |
| JP | 07-046248 A | 2/1995 |
| JP | H964901 | 3/1997 |
| JP | 10041969 A | 2/1998 |
| JP | 11-252183 A | 9/1999 |
| WO | 9307684 | 4/1993 |
| WO | 9315572 | 8/1993 |
| WO | 9505720 | 2/1995 |
| WO | 9517724 A1 | 6/1995 |
| WO | 9623377 | 1/1996 |
| WO | 9604734 | 2/1996 |
| WO | 9623377 | 8/1996 |
| WO | 9623377 A1 | 8/1996 |
| WO | 9639757 A1 | 12/1996 |
| WO | 9721316 | 6/1997 |
| WO | 9729602 | 8/1997 |
| WO | 9738509 A1 | 10/1997 |
| WO | 9741650 | 11/1997 |
| WO | 9916270 A1 | 4/1999 |
| WO | 9937047 A1 | 7/1999 |
| WO | 0024216 | 4/2000 |
| WO | 0068824 | 11/2000 |
| WO | 0143467 | 6/2001 |
| WO | 0143467 A1 | 6/2001 |
| WO | 02058336 A2 | 7/2002 |
| WO | 2004107174 | 12/2004 |
| WO | 2004107638 A1 | 12/2004 |
| WO | 2004107638 A2 | 12/2004 |

OTHER PUBLICATIONS

Navarro, A. et al. "A Simple TMS320C31 DSP—PC Bus Interface Circuit," Electrotechnical Conference, 1998. MELECON 98., 9th Mediterranean, May 1998, vol. 1, pp. 530-533.

Maguire, G. et al. "A Multiport Mobile Internet-Router," IEEE 44th Vehicular Technology Conference, Jun. 1994, vol. 3, pp. 1435-1439.

Shankaranarayanan N K et al. "Multiport Wireless Access System Using Fiber/Coax Networks for Personal Communications Services (PCS) and Subscriber Loop Applications," Global Telecommunications Conference 1995. Conference Record. Communication Theory Mini-Conference, Globecom '95., IEEE Singapore Nov. 13-17, 1995, New York, New York, USA, IEEE, US, Nov. 13, 1995, pp. 977-981, XP010164519.

Proxim, Inc., White Paper, What is a Wireless LAN?.

Rypinski, Chandos "Motivation for Centralized LAN Functions" IEEE 1992.

Hecht, Jeff; Understanding Fiber Optics; 489 Pages; Second Edition; Prentice Hall, Inc., Upper Saddle River, NJ 1993.

Information Technology—Telecommunications Exchange Between Systems—Local and Metropolitan Area Networks, Specific Requirements: Part II: Wireless LAN Medium Access Control (MAC) and Physical Layer (PHY) Specifications; 528 pages; 1999 Edition; LAN MAN Standards Committee of the IEEE Computer Society; ANS/IEEE Std 802.11; Piscataway, NJ, reaffirmed 2003.

Bhagwat, et al "BlueSky: A Cordless Networking Solution for Palmtop Computers," MOBICOM '99, Aug. 15-19, 1999.

Bisdikian, et al. "WiSAP: A Wireless Personal Access Network for Handheld Computing Devices," IEEE Personal Communications, vol. 5, No. 6, Dec. 1998.

Knisely, D. N., et al., "Evolution of Wireless Data Services," IS-95 to CDMA2000, Oct. 1998.

Office Action in Reexamination U.S. Appl. No. 95/000,350 dated May 16, 2008.

Response to Office Action in Reexamination U.S. Appl. No. 95/000,350 dated Jul. 8, 2008.

Third Party Response to Office Action in Reexamination U.S. Appl. No. 95/000,350 dated Aug. 7, 2008.

Office Action in Reexamination U.S. Appl. No. 95/000,350 dated Feb. 20, 2009.

Response Office Action in Reexamination U.S. Appl. No. 95/000,350 dated Apr. 10, 2009.

Third Party Response Office Action in Reexamination U.S. Appl. No. 95/000,350 May 11, 2009.

Office Action in Reexamination U.S. Appl. No. 90/009,101 dated Mar. 13, 2009.

Response to Office Action in Reexamination U.S. Appl. No. 90/009,101 dated May 13, 2009.

Interview Summary in Reexamination U.S. Appl. No. 90/009,101 dated Apr. 9, 2009.

Notice of Intent to Issue Ex Parte Reexamination Certificate for Reexamination U.S. Appl. No. 90/009,101 dated Dec. 1, 2009.

Office Action in U.S Appl. No. 11/733,839 dated Jan. 27, 2009.

Office Action in U.S Appl. No. 11/733,839 dated Jun. 1, 2009.

Office Action in U.S Appl. No. 11/147,649 dated Apr. 16, 2008.

Office Action in U.S Appl. No. 11/622,159 dated Aug. 18, 2009.

Office Action in U.S Appl. No. 11/622,153 dated Aug. 17, 2009.

Office Action in U.S Appl. No. 10/037,225 dated Oct. 13, 2005.

Office Action in U.S Appl. No. 10/037,225 dated Jan. 10, 2006.

Notice of Allowance in U.S Appl. No. 10/037,225 dated Sep. 21, 2006.

Office Action in U.S Appl. No. 11/622,157 dated Aug. 3, 2009.

Office Action in U.S Appl. No. 11/622,161 dated Aug. 14, 2009.

Office Action in U.S Appl. No. 09/457,624 dated Oct. 3, 2002.

Office Action in U.S Appl. No. 09/457,624 dated Jun. 27, 2003.

Office Action in U.S Appl. No. 09/457,624 dated Jan. 17, 2006.

Office Action in U.S Appl. No. 09/457,624 dated May 28, 2006.

Office Action in U.S Appl. No. 09/457,624 dated Apr. 2, 2009.

Office Action in U.S Appl. No. 09/457,624 dated Sep. 24, 2009.

Office Action in U.S Appl. No. 09/231,625 dated Apr. 22, 2002.

Office Action in U.S Appl. No. 09/231,625 dated Dec. 26, 2002.

Office Action in U.S Appl. No. 09/231,625 dated Apr. 30, 2003.

Office Action in U.S Appl. No. 09/231,625 dated Oct. 23, 2003.

Office Action in U.S Appl. No. 10/725,818 dated Aug. 15, 2007.

Office Action in U.S Appl. No. 10/725,818 dated Sep. 20, 2007.

Office Action in U.S Appl. No. 10/725,818 dated Jul. 14, 2008.

Office Action in U.S Appl. No. 10/725,818 dated Nov. 26, 2008.

Office Action in U.S Appl. No. 10/725,818 dated Jun. 8, 2009.

Office Action in U.S Appl. No. 10/725,818 dated Dec. 30, 2009.

Office Action in U.S Appl. No. 09/457,624 dated Jan. 15, 2010.

Office Action in U.S Appl. No. 10/784,588 dated Oct. 17, 2008.

Office Action in U.S Appl. No. 10/784,588 dated May 14, 2008.

Office Action in U.S Appl. No. 10/784,588 dated Oct. 27, 2008.

Office Action in U.S Appl. No. 10/784,588 dated Jun. 8, 2009.

Notice of Allowance in U.S Appl. No. 10/784,588 dated Sep. 8, 2009.

Office Action in U.S Appl. No. 11/147,649 dated Dec. 24, 2008.

Office Action in U.S Appl. No. 11/147,649 dated May 13, 2009.

Office Action in U.S Appl. No. 09/528,697 dated Jul. 24, 2003.

Office Action in U.S Appl. No. 09/528,697 dated Oct. 22, 2003.

Office Action in U.S Appl. No. 09/528,697 dated May 14, 2004.

Office Action in U.S Appl. No. 09/528,697 dated Mar. 10, 2005.

Office Action in U.S Appl. No. 09/528,697 dated Nov. 1, 2005.

Notice of Allowance in U.S Appl. No. 09/528,697 dated Jun. 15, 2006.

Notice of Allowance in U.S Appl. No. 09/528,697 dated Jan. 12, 2007.

Office Action in U.S Appl. No. 09/780,741 dated Aug. 11, 2004.

Office Action in U.S Appl. No. 09/780,741 dated Apr. 5, 2005.

Notice of Allowance in U.S Appl. No. 09/780,741 dated May 17, 2005.

Notice of Allowance in U.S Appl. No. 09/780,741 dated Jul. 27, 2005.

Office Action in U.S Appl. No. 09/780,741 dated Nov. 28, 2005.

Notice of Allowance in U.S Appl. No. 09/780,741 dated Jun. 22, 2006.

Notice of Allowance in U.S Appl. No. 09/780,741 dated Sep. 21, 2006.

Office Action in U.S Appl. No. 11/733,839 dated Jan. 25, 2010.

Office Action in U.S Appl. No. 11/147,649 dated Feb. 24, 2010.

Office Action in U.S Appl. No. 11/622,159 dated Feb. 3, 2010.

Office Action in U.S Appl. No. 11/622,153 dated Feb. 5, 2010.
Office Action in U.S Appl. No. 11/622,157 dated Feb. 5, 2010.
Office Action in U.S Appl. No. 11/622,161 dated Feb. 18, 2010.
Office Action in U.S. Appl. No. 11/622,074 dated Mar. 11, 2010.
Rypinski, C., Motiviation for Centralized Wireless LAN Function, IEEE 1992.
Office Action in U.S Appl. No. 11/147,649 dated Jun. 15, 2010.
Office Action in U.S Appl. No. 11/622,159 dated Jul. 22, 2010.
Office Action in U.S Appl. No. 11/622,153 dated Jul. 14, 2010.
Office Action in U.S Appl. No. 11/622,157 dated Jul. 14, 2010.
Office Action in U.S Appl. No. 09/457,624 dated Jul. 13, 2010.
Office Action in U.S Appl. No. 10/725,818 dated Jul. 16, 2010.
Office Action in U.S. Appl. No. 10/725,818 dated Nov. 10, 2010.
Office Action in U.S. Appl. No. 11/733,839 dated Dec. 8, 2010.
Office Action in U.S Appl. No. 11/147,649 dated Sep. 17, 2010.
Office Action in U.S Appl. No. 11/622,074 dated Oct. 15, 2010.
Office Action in U.S Appl. No. 11/622,159 dated Oct. 19, 2010.
Office Action in U.S Appl. No. 11/622,157 dated Oct. 14, 2010.
Office Action in U.S Appl. No. 09/457,624 dated Sep. 29, 2010.
Office Action in U.S Appl. No. 10/733,839 dated Aug. 23, 2010.
Office Action in U.S Appl. No. 11/622,161 dated Sep. 1, 2010.
Office Action in U.S Appl. No. 11/622,153 dated Oct. 14, 2010.
Final Office Action for U.S. Appl. No. 11/622,153, dated Nov. 3, 2011.
EP International Search Report for EP Application No. 08166878.2-2412, dated Jun. 16, 2011.
Office Action for U.S. Appl. 11/622,153, dated Mar. 16, 2011.
Office Action for U.S. Appl. No. 11/147,649, dated Mar. 16, 2011.
Final Office Action for U.S. Appl. No. 09/457,624, dated Apr. 26, 2011.
Final Office Action for U.S. Appl. No. 12/633,302, dated May 11, 2011.
Chinese Office Action for Application No. 200810186325.8, dated May 25, 2011.
Office Action, dated Oct. 14, 2011, issued in U.S. Appl. No. 09/457,624.
Office Action, dated Jan. 12, 2012, for U.S. Appl. No. 12/633,302.
Response to Office Action for U.S. Appl. No. 10/155,794, dated Apr. 23, 2004.
Response to Office Action for U.S. Appl. No. 10/155,794, dated Sep. 24, 2004.
Response to Office Action for U.S. Appl. No. 09/457,624, dated Feb. 7, 2005.
Response to Office Action for U.S. Appl. No. 10/856,157, dated May 31, 2007.
Response to Office Action for U.S. Appl. No. 10/784,588, dated Jan. 17, 2008.
Response to Office Action for U.S. Appl. No. 10/725,818, dated Jan. 22, 2008.
Response to Office Action for U.S. Appl. No. 10/856,157, dated Feb. 15, 2008.
Response to Office Action for U.S. Appl. No. 10/725,818 dated Mar. 25, 2008.
Response to Office Action for U.S. Appl. No. 09/457,624, dated May 19, 2008.
Response to Office Action for U.S. Appl. No. 95/000,350, dated Jul. 8, 2008.
Response to Office Action for U.S. Appl. No. 11/147,649, dated Sep. 16, 2008.
Response to Office Action for U.S. Appl. No. 10/856,157, dated Sep. 29, 2008.
Response to Office Action for U.S. Appl. No. 10/725,818, dated Sep. 30, 2008.
Response to Office Action for U.S. Appl. No. 10/784,588, dated Sep. 30, 2008.
Response to Office Action for U.S. Appl. No. 10/784,588, dated Feb. 27 2009.
Response to Office Action for U.S. Appl. No. 10/856,157, dated Feb. 27 2009.
Response to Office Action for U.S. Appl. No. 11/147,649, dated Feb. 27, 2009.
Response to Office Action for U.S. Appl. No. 09/457,624, dated Jul. 26, 2011.
Response to Office Action for U.S. Appl. No. 09/457,624, dated Mar. 31, 2003.
Response to Office Action for U.S. Appl. No. 11/733,839, dated Feb. 27, 2009.
Response to Office Action for U.S. Appl. No. 95/000,350, dated Apr. 10, 2009.
Response to Office Action for U.S. Appl. No. 09/457,624, dated Jul. 31, 2009.
Response to Office Action for U.S. Appl. No. 10/784,588, dated Jul. 31, 2009.
Response to Office Action for U.S. Appl. No. 10/856,157, dated Jul. 31, 2009.
Response to Office Action for U.S. Appl. No. 11/147,649, dated Oct. 13, 2009.
Response to Office Action for U.S. Appl. No. 11/733,839, dated Oct. 28, 2009.
Response to Office Action for U.S. Appl. No. 11/622,153, dated Oct. 29, 2009.
Response to Office Action for U.S. Appl. No. 10/725,818, dated Nov. 9, 2009.
Response to Office Action for U.S. Appl. No. 11/622,074, dated Nov. 24, 2009.
Response to Office Action for U.S. Appl. No. 11/622,157, dated Nov. 30, 2009.
Response to Office Action for U.S. Appl. No. 11/622,161, dated Nov. 30, 2009.
Response to Office Action for U.S. Appl. No. 09/457,624, dated Apr. 30, 2009.
Response to Office Action for U.S. Appl. No. 10/725,818, dated Apr. 30, 2010.
Response to Office Action for U.S. Appl. No. 11/147,649, dated Apr. 30, 2010.
Response to Office Action for U.S. Appl. No. 11/622,074, dated Apr. 30, 2010.
Response to Office Action for U.S. Appl. No. 11/622,153, dated Apr. 30, 2010.
Response to Office Action for U.S. Appl. No. 11/622,157, dated Apr. 30, 2010.
Response to Office Action for U.S. Appl. No. 11/622,161, dated Apr. 30, 2010.
Response to Office Action for U.S. Appl. No. 11/733,839, dated May 27, 2010.
Response to Office Action for U.S. Appl. No. 11/147,649, dated Jun. 30, 2010.
Response to Office Action for U.S. Appl. No. 09/457,624, dated Jul. 29, 2010.
Response to Office Action for U.S. Appl. No. 11/622,074, dated Jul. 30, 2010.
Response to Office Action for U.S. Appl. No. 11/622,153, dated Jul. 30, 2010.
Response to Office Action for U.S. Appl. No. 11/622,157, dated Jul. 30, 2010.
Response to Office Action for U.S. Appl. No. 10/725,818, dated Aug. 31, 2010.
Response to Office Action for U.S. Appl. No. 11/733,839, dated Sep. 23, 2010.
Response to Office Action for U.S. Appl. No. 11/622,153, dated Oct. 29, 2010.
Response to Office Action for U.S. Appl. No. 11/622,157, dated Oct. 29, 2010.
Response to Office Action for U.S. Appl. No. 11/622,074, dated Dec. 30, 2010.
Response to Office Action for U.S. Appl. No. 11/622,161, dated Dec. 30, 2010.
Response to Office Action for U.S. Appl. No. 09/457,624, dated Oct. 31, 2011.
Response to Office Action for U.S. Appl. No. 11/147,649, dated Oct. 31, 2011.
Response to Office Action for U.S. Appl. No. 11/733,839, dated Oct. 31, 2011.
Response to Office Action for U.S. Appl. No. 11/725,818, dated Oct. 28, 2011.

Response to Office Action for U.S. Appl. No. 11/147,649, dated Apr. 29, 2011.
Response to Office Action for U.S. Appl. No. 11/622,161, dated Apr. 29, 2011.
Response to Office Action for U.S. Appl. No. 10/725,818, dated Jul. 29, 2011.
Response to Office Action for U.S. Appl. No. 11/622,153, dated Aug. 16, 2011.
Response to Office Action for U.S. Appl. No. 11/622,074, dated Dec. 30, 2011.
Response to Office Action for U.S. Appl. No. 11/622,153, dated Dec. 30, 2011.
Response to Office Action for U.S. Appl. No. 09/457,624, dated Jan. 17, 2012.
Response to Office Action for U.S. Appl. No. 11/622,153, dated Feb. 29, 2012.
Response to Office Action for U.S. Appl. No. 12/633,302, dated Mar. 30, 2012.
Response to Office Action for U.S. Appl. No. 10/725,818, dated Feb. 27, 2009.
Response to Office Action for U.S. Appl. No. 11/622,159, dated Jan. 31, 2011.
Response to Office Action for U.S. Appl. No. 11/622,159, dated Nov. 30, 2009.
Response to Office Action for U.S. Appl. No. 11/622,159, dated Apr. 30, 2010.
Response to Office Action for U.S. Appl. No. 11/622,159, dated Jul. 30, 2010.
Response to Office Action for U.S. Appl. No. 09/457,624, dated Mar. 21, 2003.
Office Action mailed on Aug. 2, 2006 in Canadian Patent Application No. 2393719 (SBL00001P).
Office Action mailed on Aug. 31, 2009 in Canadian Patent Application No. 2393719 (SBL00001P).
Office Action mailed on Mar. 31, 2011 in Canadian Patent Application No. 2393719 (SBL00001P).
Supplementary European Search Report mailed on Mar. 13, 2003 in European Patent Application No. 00983998.6 (SBL00001P_EPC_01).
Office Action mailed on May 21, 2004 in European Patent Application No. 00983998.6 (SBL00001P_EPC_01).
Notice of Allowance mailed on Aug. 14, 2008 in European Patent Application No. 00983998.6 (SBL00001P_EPC_01).
Supplementary European Search Report mailed on Apr. 24, 2008 in European Patent Application No. 02736804.2 (SBL00001P_EPC_02).
Notice of Allowance mailed on Feb. 5, 2010 in European Patent Application No. 02736804.2 (SBL00001P_EPC_02).
English Translation of Office Action mailed on Jun. 1, 2010 in Japanese Patent Application No. 2001-543041 (SBL00001P_JAPA_01).
English Translation of Office Action mailed on Dec. 14, 2010 in Japanese Patent Application No. 2001-543041 (SBL00001P_JAPA_01).
European Search Report mailed on Apr. 27, 2009 in European Patent Application No. 09155416.2 (SBL00001P_EPC_D01).
Office Action mailed on Nov. 25, 2009 in European Patent Application No. 09155416.2 (SBL00001P_EPC_D01).
Office Action mailed on Feb. 7, 2012 in European Patent Application No. 09155416.2 (SBL00001P_EPC_D01).
Office Action mailed on Feb. 11, 2010 in European Patent Application No. 07004012.6 (SBL00612_EPC_D01).
Supplementary European Search Report mailed on Feb. 25, 2008 in European Patent Application No. 07004012.6 (SBL00612_EPC_D01).
Final Office Action mailed on Mar. 15, 2011 in U.S. Appl. No. 11/622,161, Robert Beach, filed Jan. 11, 2007 (SBL00931C05).
English Translation of Office Action mailed on Sep. 30, 2010 in Japanese Patent Application No. 2001-77770 (SBL00931_JAPA).
English Translation of Final Rejection mailed on Feb. 24, 2011 in Japanese Patent Application No. 2001-77770 (SBL00931_JAPA).
English Translation of Office Action mailed on Jul. 7, 2011 in Japanese Patent Application No. 2001-77770 (SBL00931_JAPA).
Non Final Action mailed on Apr. 20, 2005 in U.S. Appl. No. 10/155,794, Russell R. Reynolds, filed May 22, 2002 (SBL0000iP_USA_P01).
Final Office Action mailed on Jul. 20, 2004 in U.S. Appl. No. 10/155,794, Russell R. Reynolds, filed May 22, 2002 (SBL00001P_USA_P01).
Non Final Office Action mailed on Dec. 22, 2003 in U.S. Appl. No. 10/155,794, Russell R. Reynolds, filed May 22, 2002 (SBL00001P_USA_P01).
International Search Report mailed on Oct. 17, 2003 in International Patent Application No. PCT/US03/16168 (SBL00001P_PCT_01).
International Search Report mailed on Mar. 30, 2001 in International Patent Application No. PCT/US00/33170 (SBL00001P_PCT_02).
Notice of Allowance mailed on Sep. 14, 2011 in U.S. Appl. No. 11/147,649, Robert Beach, filed Jun. 8, 2005 (SBL00931CP1).
Notice of Allowance mailed on Jul. 22, 2011 in U.S. Appl. No. 11/147,649, Robert Beach, filed Jun. 8, 2005 (SBL00931CP1).
Notice of Allowance mailed on Jul. 1, 2011 in U.S. Appl. No. 11/733,839, Robert Beach, filed Apr. 11, 2007 (SBL00931C06).
Notice of Allowance mailed on May 16, 2011 in U.S. Appl. No. 11/733,839, Robert Beach, filed Apr. 11, 2007 (SBL00931C06).
Notice of Allowance mailed on Apr. 5, 2011 in U.S. Appl. No. 11/733,839, Robert Beach, filed Apr. 11, 2007 (SBL00931C06).
Notice of Allowance mailed on Feb. 19, 2008 in U.S. Appl. No. 10/883,294, Robert Beach, filed Jul. 1, 2004 (SBL00931-P03).
Non Final Office Action mailed on Oct. 19, 2007 in U.S. Appl. No. 10/883,294, Robert Beach, filed Jul. 1, 2004 (SBL00931-P03).
Non Final Office Action mailed on May 14, 2007 in U.S. Appl. No. 10/883,294, Robert Beach, filed Jul. 1, 2004 (SBL00931-P03).
Non Final Office Action Mailed on Oct. 6, 2011 in U.S. Appl. No. 10/725,818, Robert Beach, filed Dec. 1, 2003 (SBL00612C01).
Notice of Allowance mailed on Jun. 22, 2006 in U.S. Appl. No. 09/780,741, Robert Beach, filed Feb. 9, 2001 (SBL00931P01).
Non Final Office Action mailed on May 13, 2009 in U.S. Appl. No. 11/147,649, Robert Beach, filed Jun. 8, 2005 (SBL00931CP1).
Final Office Action mailed on Dec. 24, 2008 in U.S. Appl. No. 11/147,649, Robert Beach, filed Jun. 8, 2005 (SBL00931CP1).
Final Office Action mailed on Apr. 17, 2012 in U.S. Appl. No. 09/457,624, Juan Grau, filed Dec. 8, 1999 (SBL00001P_USA).
Final Office Action mailed on Jun. 21, 2012 in U.S. Appl. No. 12/633,302, Robert Beach, filed Dec. 8, 2009 (SBL00612CO3).
Non Final Office Action mailed on Jul. 18, 2012 in U.S Appl. No. 11/622,157, Robert Beach, filed Jan. 11, 2007 (SBL00931CO3).
European Search Report mailed on Apr. 7, 2012 in European Patent Application No. 101832319 (SBL00931 EPC_D02).

* cited by examiner

RF PORT FOR MULTIPLE WIRELESS LOCAL AREA NETWORKS

REFERENCE TO PRIOR APPLICATIONS

This application is a continuation of pending application U.S. application Ser. No. 09/780,741, filed Feb. 9, 2001, which is a continuation-in-part application of U.S. application Ser. No. 09/528,697, hereby are incorporated in their entirety by reference.

TECHNICAL FIELD

This invention relates to wireless data communications networks, and in particular to arrangements for communications between mobile data handling units and a central computer using wireless data communications.

BACKGROUND

The assignee of the present invention supplies a wireless data communications system known as the Spectrum 24 System, which follows the radio data communications protocol of IEEE Standard 802.11. In the system as implemented, mobile units are in data communication with a central computer through access points. The access points may communicate with a central computer or computers over a wired network. Each of the mobile units associates itself with one of the access points. The access points in this system are functional to perform all the implemented requirements of the standard protocol, including, association and roaming functions, packet formulation and parsing, packet fragmentation and re-assembly encryption and system access control. In order to maintain order and reduce radio communications each access point must determine which of the data communications received over the wired network from the central computer is destined for a mobile unit associated with that particular access point. This requirement adds significant computational capacity to the access point, increasing the cost thereof.

In addition, in applications that must support a high volume of data communications from multiple users, such as systems supporting a self-service shopping system, hospital systems, systems that include paging or voice data links to many users, or systems supporting communicating with electronic shelf labels, additional access points are required to support the data communications traffic, increasing the overall system cost.

The cost of an operational access point is dependent not only on the complexity thereof and the requirement for high speed processing of data pockets for purposes of selecting those destined for mobile units associated with an access point, but the additional cost of the installation of electrical power to the location of the access point, and the cost of a power supply to convert AC electrical power to DC power for the circuits of the access point. Further cost may be involved in physically mounting the access point hardware and antenna.

In prior systems each access point is connected on an Ethernet wired network to the central computer. The access points are required to determine the identity of mobile units which have become associated with them and to extract from the data packets on the Ethernet network those packets addressed to a mobile unit associated with the access point. This requirement has led to significant processing burden for the access points and led to increased cost for the access points.

In the system described in my prior published International Patent Application WO 099 37047, published Jul. 22, 1999, the central computer communicates over an Ethernet wired network with an intelligent switching hub. Alternately a token ring network can be used. The switching hub determines the destination of each packet and routes packets to an access point if the destination of the packet is a mobile unit associated with the access point. To achieve this function, the hub is an intelligent hub which maintains a routing list of mobile units and their associated access point according to the port of the hub.

In practice, the hub need only maintain a source list for those access points connected to the hub and mobile units associated with the access points connected to the hub. Thus, if a packet is received at a hub over the Ethernet with a destination address which is not associated with that hub, the packet is ignored. The hub will route the packet to an access point only if the destination address of the packet is identified on the list. When a packet is received on a hub port associated with a communications line connected to an access point, the source address is associated with the hub port in the list. The packet is routed either to the Ethernet connection or to another port according to the destination address.

By determining destination address in the hub and maintaining the association of a mobile unit address with an access point connected to a port of the hub in a routing list of the hub, the functionality required of the access points is greatly reduced. The access point acts merely as a conduit sending RF transmissions of packets received on its communication line, and receiving transmissions from associated mobile units and providing Ethernet packets to the hub. In addition, the access point must provide mobile unit association functions and other 802.11 protocol functions, as provided in the Spectrum 24 system, and may also provide proxy polling responses for associated mobile units that are in power saving mode.

The prior system may have a large number of access points, each with a memory containing program instructions for carrying out the various required functions. This distribution of processing makes it difficult to upgrade a system or to provide changes in system configuration because any upgrade or change may require changes to the program code in each of the access points. Such distribution of processing functions also makes system management functions, such as load balancing or access control more difficult.

It is therefore an object of the present invention to provide an improved wireless data communications methods and systems having lower cost, to enable the economical provision of reliable wireless data communications with increased capacity in complex installations or at reasonable cost or simple installations.

SUMMARY

In accordance with the invention there is provided a system for providing wireless data communications between mobile units and a wired network. The system includes a plurality of RF ports having at least one data interface and arranged to receive formatted data signals at the data interface and transmit corresponding RF data signals and arranged to receive RF data signals and provide corresponding formatted data signal. There is also provided at least one cell controller, arranged to receive data signals from the wired network and to provide formatted data signals corresponding thereto and to receive formatted data signals and to provide data signals corresponding thereto to the wired network, the cell controller controls association of mobile units with one of the RF ports, provides formatted data signals for said mobile units to an associated RF port and receives formatted data signals from the mobile unit from the associated RF port.

In accordance with the invention there is provided an improvement in a wireless data communications network coupled to a data processing system, having a plurality of RF ports and mobile units, wherein the mobile units associate with one of the RF data communications ports to conduct data communications with said data processing system. The mobile units are assigned to one of the RF ports by a cell controller, and the cell controller is arranged to receive first data communications from the data processing system and to relay the data communications to an assigned RF port and to receive second data communications from the RF ports and relay the second data communications to the data processing system.

In accordance with the invention there is provided a method for operating a wireless local area network having at least one RF port, a plurality of mobile units and a cell controller coupled to the RF port. The RF is operated port to relay signals received from mobile units to the cell controller and to relay signals received from the cell controller to the mobile units. The cell controller is operated to control association of the mobile units with the RF port, including sending and receiving association signals between the RF port and the cell controller, and to send messages to and from the mobile unit via the RF ports.

In accordance with the invention there is provided an improvement in a mobile unit for use in a wireless data communications system, wherein the unit has a data processor and programs for the data processor and a wireless network adapter having a programmed processor and a radio module. The programmed processor performs first communications processor functions including control of the radio module and the data processor operates under the programs to perform second communications processor functions, including association with a radio access location of the wireless data communications system.

According to the invention there is provided an improvement in a wireless data communications system for providing data communications following a standardized protocol, wherein the protocol includes association of mobile units with radio access locations. At least one RF port is provided at a radio access location, which RF port comprises a radio module and an RF port processor in data communications with a programmed computer. The RF port processor performs first functions of the standardized protocol and the programmed computer performs second functions of the standardized protocol, including the association of mobile units with said radio access location.

According to the invention there is provided an RF port for use in a wireless data communications system comprising a radio module having a data interface and a transmitter/receiver for wireless data communications; and a digital signal processor having first and second data communications ports, random access memory and read-only memory. The second data communications port is coupled to the data interface of said radio module. The read-only memory is provided with a bootloader program for controlling the digital signal processor to load program instructions to the random access memory via the first communications port. According to the invention there is provided a method for operating an RF port having a radio module, a digital processor, random access memory and read-only memory. A bootloader program is stored in the read-only memory. The digital processor is operated to download instructions from a computer to the random access memory using the bootloader program and the RF port is operated under the downloaded instructions to send and receive messages using the radio module.

According to the invention there is provided a method for transmitting signals having a wireless signal format using an RF port having a wired network interface, a data processor and an RF module. Signals are provided to the wired network interface having wireless address data and message data within a data packet addressed to the RF port using a protocol for the wired network. The processor is operated to provide wireless data signals having the wireless signal format for the address data and the message data to said RF module and operating the RF module is operated to transmit the wireless data signals as an RF signal modulated with the wireless signal format.

According to the invention there is provided a method for transmitting signals having a wireless signal format using an RF port having an Ethernet interface, a data processor and an RF module. An Ethernet data packet is provided to the Ethernet interface, the Ethernet data packet encapsulating as data a data message having the wireless signal format. The data processor is operated to provide the data message to the RF module. The RF module is operated to transmit the data message as an RF signal.

According to the invention there is provided a method for receiving signals having a wireless signal format including wireless address data and message data at an RF port having a wired network interface, a data processor and an RF module. The RF module is operated to receive RF signals having the wireless signal format. The data processor is operated to receive wireless data signals from the RF module and provide data signals to the wired network interface comprising a data packet having a source address corresponding to the RF port using a protocol for the wired network, the data packet including the wireless address data and the message data.

According to the invention there is provided a method for receiving RF message signals having a wireless signal format including an address data format and message data using an RF port having an Ethernet interface, a data processor and an RF module. The RF message signals are received in the RF module and provided as data signals to the data processor. The data processor is operated to interpret address data in the data signals and, in dependence on the address data, said message data and said address data is encapsulated in an Ethernet packet, which is provided to the Ethernet interface.

In accordance with the invention there is provided a simplified wireless local area network system including a computer having a data processor and a memory, an RF port having an RF port data processor, an RF module and a data communications interface coupled to the computer. A first program is provided in the memory of the computer for operating the computer data processor to perform first wireless data communications functions, including association with mobile units. A second program is provided for operating the RF port data processor to perform second wireless data communications functions.

According to the invention there is provided a wireless access device for providing wireless access to a communication system. The device includes a modem for sending and receiving data messages on the communications system and an RF port, having a data interface coupled to the modem, a data processor and an RF module. The data is programmed to receive data messages from the modem, to format the messages for wireless data communications and to provide the formatted messages to the RF module for transmission by RF data signals to at least one remote station, and to receive RF data signals from the at least one remote station, and to provide data messages to the modem to be sent on the communications system.

According to the invention there is provided a method for providing wireless access to the Internet. A modem having a data communications interface connected to an RF port is connected to the Internet. The RF port is configured for wireless data communication to at least one mobile unit having a predetermined wireless communications address. A mobile unit configured with the predetermined wireless communications address is provided for conducting RF data communications with the RF port. The RF port is arranged to relay communications between the mobile unit and the modem.

The apparatus and methods of the present invention provide RF ports as radio access locations which are less expensive than known access points and provide greater system management and flexibility. Much of the software used for controlling communications to and from mobile units is performed in a controller wherein software upgrades and changes are easily implemented. According to some embodiments, wherein instructions are downloaded to RF ports, it becomes easy to upgrade RF port instructions. System control is centralized, making management easier and enabling changes to access control and encryption functions. Priority for traffic purposes can also be established to facilitate digital telephony by giving priority to voice traffic. Accordingly, a system is provided that has significant flexibility using common RF port hardware to provide a wireless LAN having from one to hundreds of radio access locations.

According to the invention, the same RF port may provide multiple ESS identifications such that each ESS identification is associated with a separate virtual wireless local area network having its own policies and security.

For a better understanding of the present invention, together with other and further embodiments thereof, reference is made to the following description, taken in conjunction with the accompanying drawings, and its scope will be pointed out in the appended claims.

DETAILED DESCRIPTION

Figure 1:
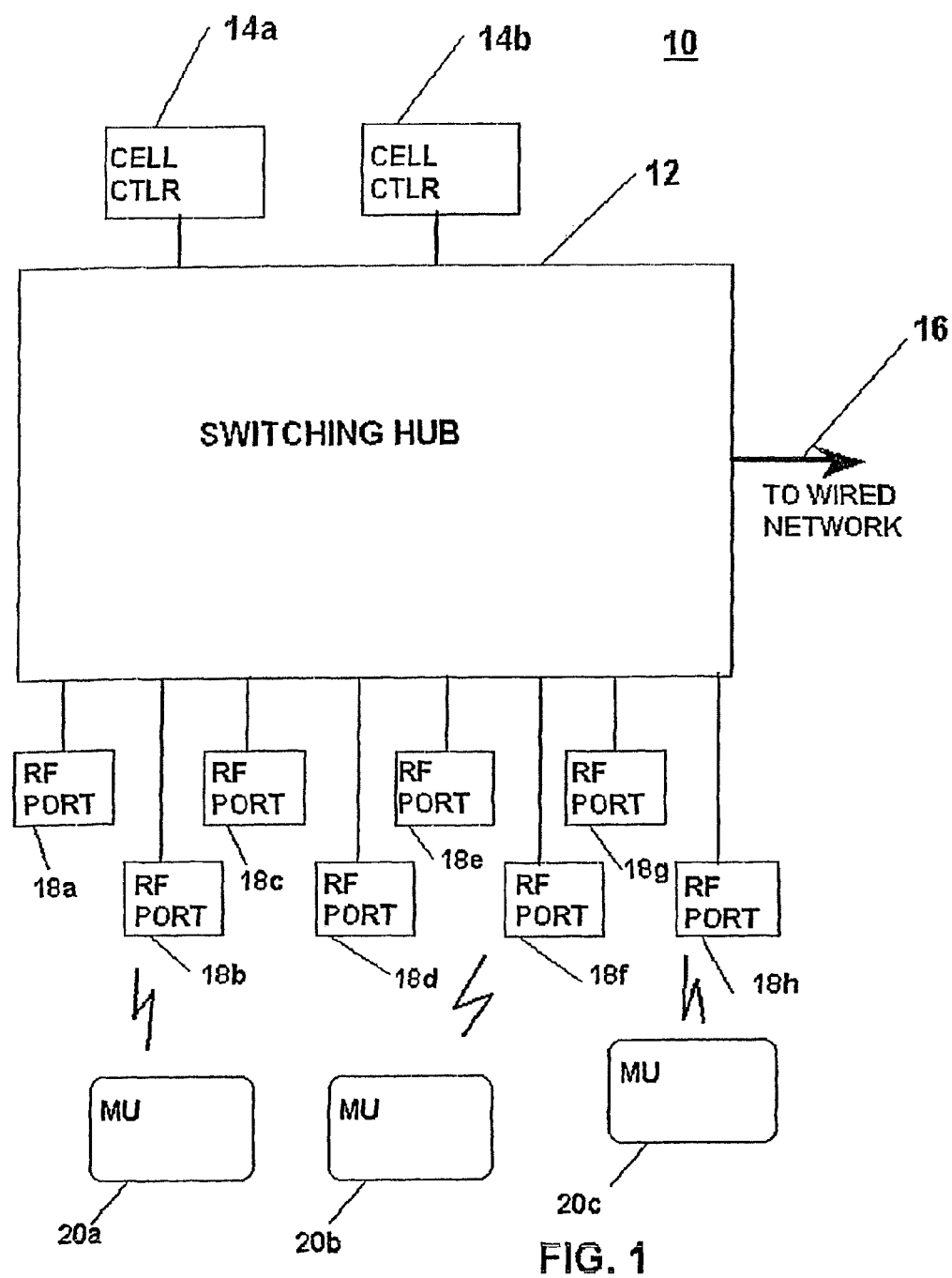
FIG. 1 is a block diagram of a wireless communications system in accordance with the present invention.

Referring to FIG. 1, there is shown an example of a wireless data communications system 10 according to the present invention for providing data communications between a central computer or a collection of computers on a wired network 16 and a plurality of mobile units 20. While prior systems used access points at each radio access location, where the access points are capable of managing wireless communications with mobile units, the system of FIG. 1 uses simplified RF ports 18 at each radio access location to provide radio packet communications with the mobile units 20 using a wireless communications protocol, such as IEEE Standard 802.11, whereby the radio modules in the mobile units 20 monitor polling signals from the RF ports 18, which are originated by the cell controllers 14 and associate with an RF port 18 for purposes of data communications. The system arrangement of FIG. 1 is especially effective in a large wireless local area network (LAN) system wherein it may be necessary to provide a large number of radio access locations. Typically such systems, operating at low power microwave frequencies, require radio access locations at about every 100 feet. Where the wireless LAN system must operate with mobile units, for example, portable computers or similar devices, located throughout a large facility, such as a business, hospital complex or university campus, many such radio access locations may be required, possibly several hundred. Accordingly there is an incentive to reduce the cost of the installation at each radio access location. According to the present invention the system configuration and operation are redesigned to reduce the cost of each individual radio access point. In addition, the system of the present invention provides a concentration of operational control in one or more central controllers 14, making management of the system easier and making modifications and upgrades easier to install.

According to the invention, much of the functionality of the 802.11 protocol associated with the conventional access point, is removed from the device located at the radio access location and provided in a cell controller 14, which may be located in conjunction with a switching hub 12, connected to the wired network 16, with which the wireless network 10 is associated. In particular the usual "access point" device is replaced with a simpler device 18, herein referred to as an "RF port" which contains the RF module, which may be the same RF module used in the prior art access point, and simplified digital circuits to perform only a limited portion of the 802.11 media access control (MAC) functions performed by the prior art access point. In particular the RF port 18 preferably performs only functions of the access point that require a lower level of processing resources in terms of processor capacity and software complexity (memory requirement), and which are time critical. Other functions that are more processor intensive and require more complex programming, and which are not time critical, are relegated to one or more "cell controllers" 14, which may perform these more complex functions for a plurality of RF ports 18.

In order to perform the higher level processing functions of the access point in the cell controller 14, according to the present invention, all messages directed to or from mobile units 20 associated with a particular RF port 18 are processed in a cell controller 14. A system may have one or more cell controllers, which may comprise, e.g. Pentium-type board level computers, each of which is arranged and programmed to handle data message traffic and mobile unit associations for a selected plurality of RF ports 18. A switching hub 12 may be interposed to provide message switching among the wired network connected to communications line 16, RF ports 18 and cell controllers 14. Each of the one or more cell controllers 14 acts as a virtual "access point" for traffic addressed to its associated RF ports 18 and to the mobile units 20 associated with those RF ports. When a message is addressed to a mobile unit 20 is received on line 16, switching hub 12 directs the message to the appropriate cell controller 14, which reformats the message and relays the message to the appropriate RF port 18, again through switching hub 12. When the message is received by an RF port 18, it is converted to a radio message and sent to the mobile unit 20 with a minimum of processing.

Likewise, when a message is received from a mobile unit 20 by an RF port 18, it is converted to a digital message packet and relayed to the cell controller 14 associated with the RF port 18 through the switching hub 12. The cell controller 14 parses the message for further relay in the system.

An important feature of a preferred embodiment of the invention is the fact that mobile unit association with the RF ports 18 is a function handled by the cell controller 14. Accordingly, when a mobile unit 20 first becomes active, it sends an association request signal in response to a beacon signal sent by an RF port 18 (in response to direction by the cell controller). The association request signal is relayed by the RF port 18 to the cell controller 14, which performs the processing required for association, including consideration of RF port loading. Cell controller 14 generates appropriate response signals to be sent by the RF port 18 to the mobile unit 20. The cell controller 14 is in an appropriate position to evaluate the loading of the RF ports 18 under its control, and may therefore easily perform load leveling functions, for example, by providing a message to RF port 18 accepting or declining an association request. In addition, the cell controller 14 may receive load messages from other cell controllers 14 in the system 10 and thereby coordinate overall load management. As a mobile unit 20 moves from a location serviced by one RF port 18 to a location serviced by a different RF port 18, the cell controller 14 receives information from the mobile unit 20 indicative of its reception of beacon signals from the various RF ports in the system and performs the necessary functions to support roaming of mobile unit 20.

While in the system 10 of FIG. 1 the cell controllers 14 are shown as separate computers connected to switching hub 12, the term "cell controller" is intended to refer to the logical functions performed by these computers rather than the computers themselves. As will become apparent, the cell controller may be implemented in a variety of ways other than as shown in the exemplary system 10 of FIG. 1.

Implementation of a simplified RF port is achieved by performing "higher level" functions of the 802.11 protocol Media Access Control (MAC) in the cell controller and performing "lower level" functions in a simplified RF port.

The lower level functions are those that are hardware intensive and often time critical. The higher level functions are those that are software intensive and not time critical. One possible division of the exemplary 802.11 MAC functions is as follows:

Lower Level Functions (preferably to be performed at RF port)
   Cyclic Redundancy Check (CRC)
   Network Activity Vector (NAV)
   Ready to Send/Clear to Send (RTS/CTS)
   Header generation/parsing
   Collision Avoidance
   Frequency Hopping
   Ack parsing/generating
   Retransmission timeout Higher Level Functions (preferably to be performed at Cell Controller)
   Association processing
   Roaming
   Retransmission
   Rate Control
   Host Interface The following optional (higher or lower) level MAC functions can be placed in either the higher or lower level categories.
   Wired Equivalent Privacy encryption/decryption (WEP)
   Fragmentation/Reassembly
   Data Movement
   Power Save Polling Support (PSP)

According to a preferred arrangement of the system of the invention, the lower level MAC functions are provided at the RF port, the higher level MAC functions are provided in the cell controller and the optional level functions can be provided at either the cell controller or the RF port.

A major advantage of the invention is a cost savings in hardware, processor capacity and storage capacity for the RF port. Since a system with, for example, one hundred or more radio access locations may be implemented with one or two cell controllers, the processor hardware and memory required for the higher level MAC functions need be provided only at the cell controllers. In fact, the capabilities of the overall system, for WEP encryption and other special functions, can be increased at modest cost by using a high performance board level personal computer or even a host computer as a cell controller.

By eliminating the higher level MAC functions from the radio access locations, the cost of the devices installed at those locations can be significantly reduced because of lower processor capacity and storage.

In connection with association and roaming functions the RF ports 18 provide beacon signals in response to commands generated by the cell controller 14. When an association sequence is initiated by a mobile unit, the RF port 18 relays the association messages between the mobile unit 20 and the cell controller 14 during the association process, which is handled by the cell controller 14.

In connection with message traffic to a mobile unit 20 from a network processor, message packets are routed by switching hub 12 to the cell controller 14 responsible for the mobile unit 20 addressed. The message is buffered and formatted by the cell controller 14 and in a preferred arrangement encapsulated by the cell controller 14 as a mobile unit packet within a wired network packet addressed to the responsible RF port 18. This packet is routed to the RF port 18. The RF port 18 extracts the mobile unit packet from the message and sends the packet to mobile unit 20 as a radio signal. The RF port 14 may also provide a CRC calculation and generate CRC data to be added to the message. The mobile unit 20 responds with an acknowledgment signal to the RF port 18, which generates and sends an acknowledgment status message to cell controller 14.

In connection with messages for systems connected to the wired network 16, the mobile unit 20 sends a packet to the RF port 18 by radio signal. The RF port 18 filters received radio message packets according to the BSS (Basic Service Set) identifier in the packet and, if the packet has a BSS identifier associated with the RE port 18, performs the CRC check as the packet is received. The RF port 14 then generates and sends an acknowledgment signal to the mobile unit 20 and sends the received packet to cell controller 14. Cell controller 14 buffers, parses and, if necessary, decrypts the packet and routes the packet to the host on network 16 through hub 12.

The arrangement of RF port 18 may be identical to current access points used in the Spectrum 24 system with some of the access point software non-functional. Preferably the RF ports are simplified to reduce cost and power consumption. To reduce installation expenses the RF ports are powered via an Ethernet cable, which also connects RF ports 18 to switching hub 12 or to cell controller 14. The RF ports can be arranged in a small package (e.g. portable radio size) with integrated diversity antennas and arranged for easy mounting, such as by adhesive tape or Velcro. Connection to the switching hub 12 is by Ethernet cable which is also provided with D.C. power, such as by use of a choke circuit, such as Pulse Model PO421 as described in my referenced International Application. The choke circuit may be built into an Ethernet connector and is available in this configuration.

Figure 3:
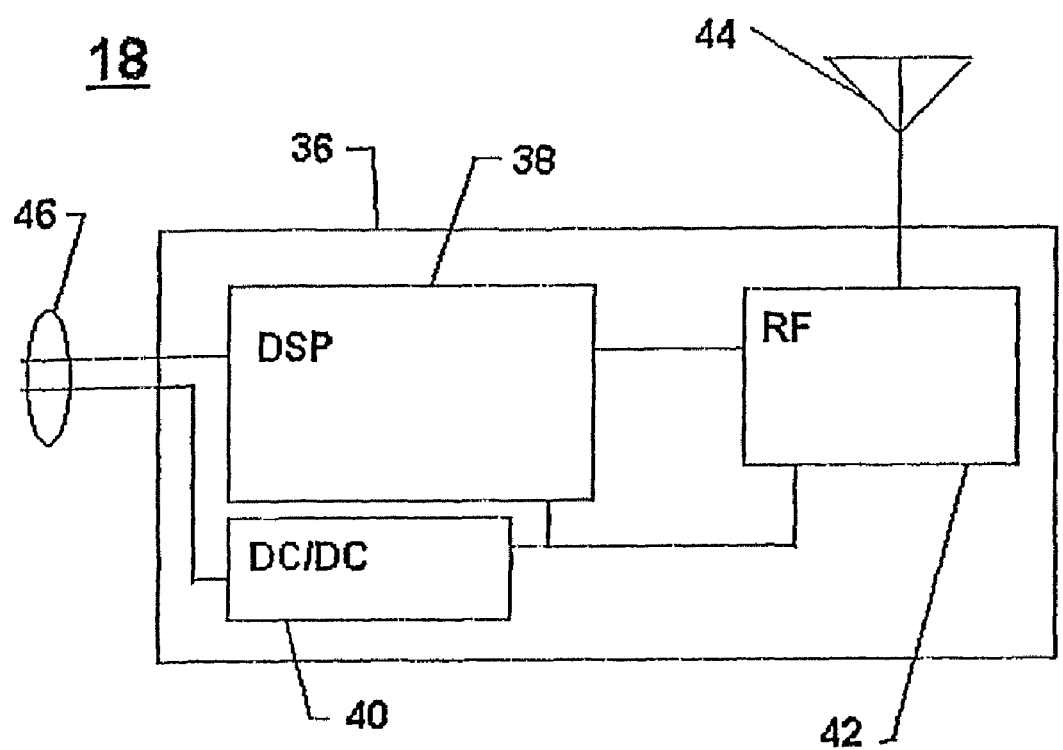
FIG. 3 is a block diagram illustrating one example of an RF port for the system of FIG. 1.

The RF port 18 does not have to perform Ethernet address filtering and does not have to perform 802.11 association and roaming functions and can therefore have a lower level of processor capacity, software support, memory and power consumption. In one embodiment shown in FIG. 3 the RF port 18 includes only a digital signal processor (DSP) 38 which includes internal RAM and ROM. The DSP 38, which may be one of the Texas Instruments TMS 320 family of DSP processor, such as the 5000 series, specifically the TMS 320 UC 5402 or the TMS 320 VC 5402. This DSP provides an interface between the Ethernet cable 46 and the RF module 42 in RF port 18, as shown in FIG. 3. The RF module 42 is provided in housing 36 with DSP 38, DC/DC power supply 40 and carrying one or more antennas 44. RF module 42 includes a 3860 or 3861 baseband processor, such as HFA 3860B, to interface with the digital portion of the RF port 18, specifically DPS 38. In one arrangement the ROM memory of the DSP 38 can be provided with "bootloader" firmware that downloads the necessary DSP software instructions from the cell controller 14 upon startup of the RF port 18, and loads the instruction into the RAM of the DSP 38.

The processors that are currently preferred as a possible lower level MAC engine are the TMS320UC5402 and the TMS320VC5402. These parts are functionally identical except for differences in power consumption (the VC5402 is currently in production and while the UC5402 is still being sampled). The basic configuration of the UJC5402/VC5402 is:

100 MIPS execution rate

8 KB on chip ROM (organized as 4 K.times.16 bits)

32 KB on chip RAM (organized as 16 K.times.16 bits)

Two 16 bit timers with 1 µs or better resolution

Two High speed, full duplex serial ports (up to 50 Mbits/sec each) with smart DMA channel support One High speed 8 bit wide host/parallel port (160 Mbits/sec)

Six DMA channels for general purpose use 16 bit external memory/IO Bus with internal wait state generation 16 interrupts with 3 instruction (30 ns) worst case latency 0.54 mW/MHz power consumption (30 mA@1.8 v at 100 MHz)

Low Power Modes (6 mA, 2 mA, 2 µA depending on setting)

Internal PLL, that generates the system clock with an external crystal

This section will describe the use of a 5402 DSP 38 as a MAC engine for 11 Mbits/sec 802.11 DS systems. It could clearly be used in FH systems as well. We will focus on the how the 5402 interfaces to the Intersil 3860/1 baseband processor in RF module 42 and how it implements the lower level MAC functions.

Figure 4:
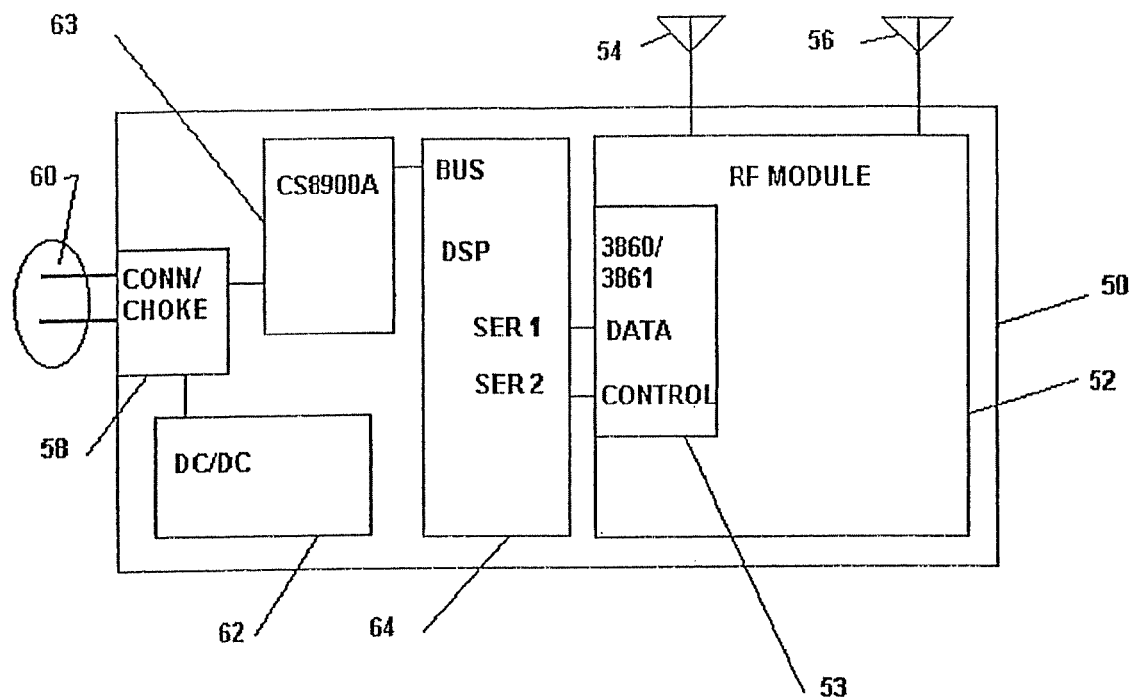
FIG. 4 is a more detailed block diagram of a preferred embodiment of an RF port in accordance with the invention.

The first issue is how the 5402 DSP 38 interfaces to the 3861 (much of what is said applies to the 3860 as well) and the rest of the RF module 42. As shown in FIG. 4, the 3861 processor 53 in RF module 52 of RF port 50 has 2 major interfaces, both serial. The first interface, labeled DATA, is used to transfer data between the MAC engine comprising DSP 64 and the 3861. It has four lines: TxD, TxC, RxD, and RxC and operates at up to 11 Mbits/sec. The exact rate depends on the transfer rate of the packet. The clock signals of both interfaces are generated by the 3861 and so transfers are controlled by the 3861. Both can be halted at any time by the 3861 as well as change rate. The second serial interface, labeled CONTROL, is used to load commands into the 3861 and read status information from the 3861. This interface is a 4 wire bi-directional interface using one data line, one clock line, one "direction control" line, and a chip select line. This serial interface also can operate at up to 11 Mbits/sec. In addition to the serial interfaces, there are additional control and status lines such as Reset, TX_PE, RX_PE, TX_RDY, etc.

The 5402 DSP 38 has two sets of full duplex serial interfaces that are capable of operation up to 50 Mbits/sec (given a 100 MHz clock). They can be clocked using internal or external sources. In this design one of the sets of serial interfaces, labeled SER1, is used to connect to the high speed data lines of the 3861 interface 53. The 5402 DSP 38 interfaces have the same basic lines (RxD, RxC, TxD, TxC) as does the 3861 and so they connect with minimal trouble. Although the 5402 uses 1.8 v for its core, its I/O lines are 3.3 v tolerant and so can interface to the 3861 without converters. In addition, they are fully static and so can deal the start/stop operation of the clock lines from the 3861.

Data transfer will be done under DMA control within the 5402 using what TI calls "Auto Buffering Mode." This provides essentially dedicated DMA channels for each serial port interface (two DMA channels per serial port interface). These channels access an independently operating bank of SRAM and so transfers have no impact on CPU performance. The CPU can start transfers in either direction and be notified via interrupt on their completion.

Interfacing to the control serial port on the 3861 interface 53 can be done in three different ways. The first, illustrated in FIG. 4, utilizes the second serial port, labeled SER 2 on the 5402 DSP 64 with a small amount of combinatorial logic/buffering to convert between the single data line of the 3861 and the dual data lines of the 5402. Another approach is to use an external shift register that would perform serial/parallel conversion. This register would sit on the I/O bus of the 5402 and would be loaded/read by the 5402 and data shifted between it and the 3861. The third approach is to use an external buffer/latch on the 5402 I/O bus and "bit bang" the clock/data lines to the 3861. The second or third approaches free up the second serial channel for more other use such as providing high speed serial interfaces such as Ethernet or USB and in some applications would be preferred over the first. All require a small amount of external combinatorial logic and so the cost of all solutions is about the same.

The same logic would apply to interfacing to the synthesizer. It is accessed even less often than the control port of the 3861 and so a "bit banging" approach would work fine.

Finally, interfacing to the various control and status lines presented by the 3861 can be done via simple bi-directional register/latch connected to the I/O bus of the 5402. The 5402 can read/write this register as it needs to control and monitor the 3861. It would be possible to combine all control/monitor functions (including the serial control interface) into a single 16 bit buffered register latch. Parallel control/status lines would be connected to particular lines of this latch. Serial control interfaces would also be connected and "bit banged" as necessary to move data between the 5402 and 3861.

The arrangement shown in FIG. 4 uses a Crystal CS 8900 A Ethernet controller 63 coupled to the parallel port of DSP 64 to interface to the Ethernet port 58. An Ethernet connector/ choke 58 receives cable 60 and provides DC power from cable 60 to DC/DC power supply 62. The FIG. 4 RF port 50 includes spaced diversity antennas 54, 56 to improve reception in multipath conditions.

A premise of this design is that the TI DSP is capable of implementing all lower level MAC functions without external hardware assistance. This, of course, is the most demanding model but we will find that the 5402 is up to the task. The most computational demanding tasks are the CRC-32 and WEP processing. The CRC-32 calculation is performed over the entire packet and must be completed in time to generate an ACK should the CRC turn out to be correct (or to attach the calculation result to an outgoing packet on transmission). This means that the CRC calculation must be performed in near real-time during packet transfer between the 3861 and 5402. TI has shown in an application note that a CRC-32 calculation can be made by a 5000 series DSP in 13 instructions. At 100 MIPS this is about 130 ns. At 11 Mbits/sec, a byte takes about 770 ns to transfer and so we have plenty of time to do the CRC. When receiving a packet, the serial port would be transferring the data from the 3861 to SRAM within the 5402. At the same time the CPU within the 5402 would be reading each received byte from SRAM and calculating the CRC. It would of course have to make sure that it did not overrun the receive buffer, but that would be a relatively simple task. Much the same process would happen during transmission. In either case, the CPU has lots of time to do the CRC.

The WEP processing if performed in the RF port 50, is a harder function to perform than CRC-32 since it includes both an RC4 encryption function and a second CRC-32. At the same time it does not need to be completed prior to ACK generation/reception nor is performed on every packet (just data packets). The RC4 encryption function consists of two parts: building the encryption table (a 256 byte table) using the selected key and doing the encryption/decryption process. Based on sample code, it is estimated that building the table would require about 1200 instructions (12 ms at 100 MIPS) and the encryption/decryption process would require about 12 instructions/byte. There is no difference in this cost for 40 or 128 bit keys. The WEP CRC-32 would require another 13 instructions per byte.

The per byte computational burden for WEP would thus be about 25 instructions or about 250 ns at 100 MIPS. When added to the packet CRC-32, the total load would be around 38 instructions/byte. As we pointed out, at 11 Mbits/sec we have about 77 instructions/byte available, so we are spending about 50% of the CPU on CRC/WEP tasks. The biggest issue is the 1200 clocks (12 us) required to build the encryption table during receive (For transmission, the calculation can be done prior to starting packet transfer). Pausing to create the table would put the CPIJ about 18 bytes (12 µs at 770 ns/byte) behind in the CRC/WEP/CRC calculation process. It would require about 40 data bytes to catch up (1200 clocks/30 extra clocks per byte) in both packet CRC and WEP/CRC functions. Since the minimum TCP/IP header is at least 40 bytes (plus any user data), we should have enough time. In any case if we are a little late in WEP/CRC calculation, no harm is done. An alternative approach would be to catch up first for the packet CRC calculation and then catch up with WEP/CRC.

After CRC and WEP/CRC processing, the next most critical activity is header parsing on receive and generation on transmit. This is because of the need to identify packets for the station and generate appropriate responses. On receive, the processor must parse two or three 48 bit addresses and at least a 16 bit header command field. After the packet completes, an ACK may need to be generated.

The 5402 can easily handle these functions. Since these functions are performed prior to WEP processing, the CPU has 64 instructions/byte (77-13) to perform these functions. Since many of them can be performed on a 16 bit or even 32 bit basis (the 5402 supports both 16 and 32 operations), there may be up to 128 or 256 instructions per data item (i.e. 256 instructions to perform a 32 bit address check). These functions are performed at 2 Mbits using a 1 MIPS 188 CPU. We have a 100 MIPS CPU to do the same tasks at 11 Mbits/sec.

ACK generation is likewise relatively simple. An ACK frame is only 14 bytes long, including the 4 CRC-32. Given there is a long (80 us) preamble, we have 8000 instructions to prepare the ACK. The same applies to RTS/CTS exchanges.

There are two 16 bit timers available on the 5402. In this model, one would be used for TSF timing and the other for all other functions. There are really only a few other timer functions: NAV, Retransmission, collision avoidance slot countdown, etc. Retransmission and collision avoidance activities go on only when waiting for an ACK or to start a retransmission after detection of an idle network. In such cases there is no data transfer going on and so there is lots of CPU cycles available.

Support for MU PSP function can be done in a variety of ways, depending on how much, if any, external hardware is provided. The 5402 provides a variety of means of conserving power. The first is simply to slow down the CPU clock via the software controlled PLL within the unit. The 5402 generates internal clocks via a PLL that is driven by either an external crystal or clock. The PLL multiplies the base frequency of the crystal/external clock by a factor determined by software. Hence one means of controlling power consumption is simply to slow down the CPU clock. Since the CPU portion of the processor consumes most of the power, slowing it down has the biggest affect on power consumption.

The second approach is use one of the IDLE modes of the processor. IDLE1 stops the CPU clock entirely but leaves everything else running. Power consumption in this mode is on the order of 6 mA at 100 MHz. The CPU can be restarted by any interrupt (internal or external). In IDLE2 the system clock is stopped and this reduces consumption to 2 mA. In IDLE3, all system functions are stopped and consumption is reduced to around 2 µa. In all cases all state is retained. In IDLE2 and IDLE3, an external interrupt is required to restart the CPU. In such cases an external, low power timer would be required.

Thus with no external hardware, power consumption could be reduced to at least 6 mA and perhaps less. With a simple external timer, one could get down to microamps.

The bottom line is that the vast CPU power of the 5402 allows all lower level MAC functions to be performed in software. Furthermore it has sufficient power and memory to handle additional "higher level" functions such as packet retransmission, fragmentation, and reassembly that can also be done in a cell controller.

The system 10 of the present invention is compatible with IEEE Standard 820.11 and accordingly will operate with any mobile units 20, including existing units, which are compatible with the same standard. However, the improvements applied to the RF ports 18, reducing the complexity and cost of these units can also be applied to the mobile units 20, which have sufficient main processor capacity to handle the mobile unit functions corresponding to the higher order MAC functions.

Figure 2:
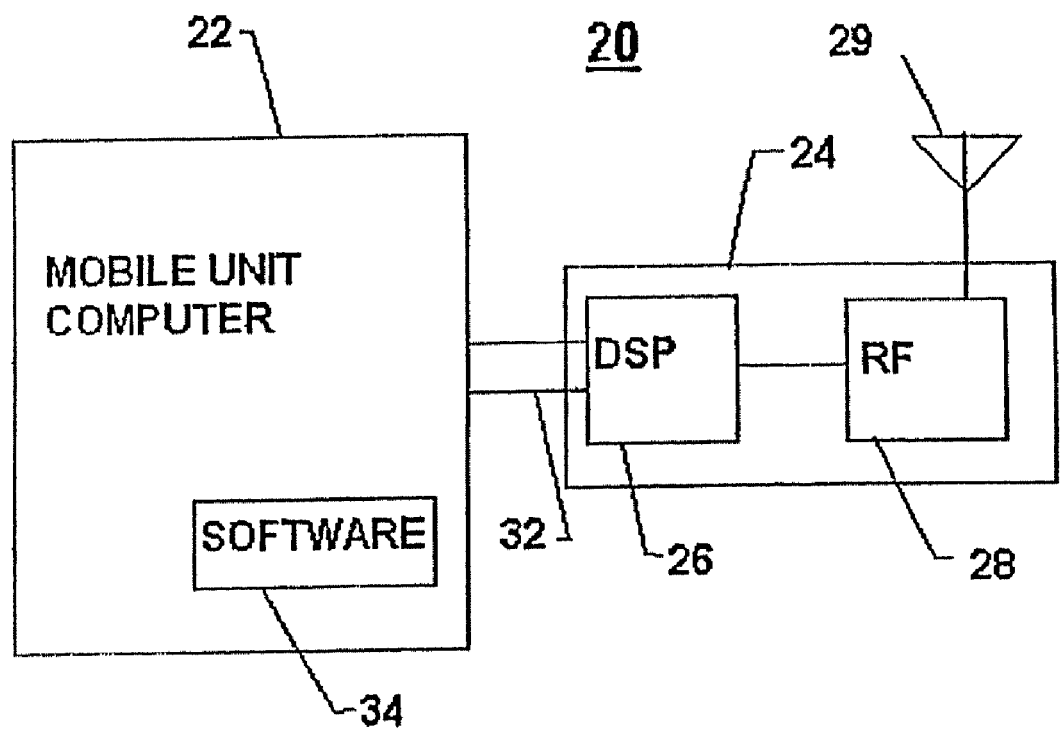
FIG. 2 is a block diagram illustrating one example of a mobile unit arranged to be used in the system of FIG. 1.

Referring to FIG. 2 there is shown a block diagram for a mobile unit 20 having a mobile unit computer 22 and a WLAN adapter 24 connected thereto to provide wireless communications to the system 10 of FIG. 1. In the mobile unit 20 of FIG. 2, the lower level MAC functions are performed in WLAN adapter 24, which also includes RF module 28 and antenna 29. The configuration of WLAN adapter 24 may be similar to existing adaptors, but preferably adapter 24 is simplified to perform only the lower level MAC functions of the IEEE 802.11 protocol and allow special software 34 in host computer 22 to perform the higher level MAC functions, such as association and roaming. In a preferred arrangement the MAC functions of adapter 24 are performed in a digital signal processor 26, as described below, which may be the same type DSP described with respect to RF port 50.

This section addresses how the 5402 DSP could be used as a MAC engine in Mobile Unit configurations. There are two considerations in building MU WLAN solutions. The first is the location of those MAC functions, while the second is the physical interface to the host.

The location of the upper level MAC functions may vary considerably. Some possibilities are:

All functions on MAC engine DSP processor 26
All functions on host processor 22
Roaming/association on host processor 22, rest on MAC engine 26
Roaming/association/retransmission on host 22, rest on MAC engine 26. The choice of the location of the higher level MAC functions has a major impact on the cost of MU WLAN adapter. If one is willing to place at least some of the higher level functions on a host processor 22, then one could get by with just the 5402 on the WLAN adapter. Possible functions to place on the host would be roaming and association control. Higher level functions such as retransmission and fragmentation/reassembly could be left on the 5402. This split would permit significant savings, since another processor/memory subsystem would not be needed on the WLAN adapter. There are two reasons for not placing all of the MAC functions on the 5402. The first is memory space on the 5402 is only 32 KB of SRAM for both code and data. In some MAC implementations such as frequency hop, the code space alone exceeds 32 KB. The second reason is that the software on the 5402 is oriented toward meeting hard, real-time tasks such as CRC and WEP processing. Trying to add software intensive tasks would only complicate the process.

If another processor was required, such as an ARM or perhaps a second 5000 Series processor, the upper level functions could be added to it.

Alternatively one could place all the MAC functions on a faster and/or bigger version of the 5402 processor. Such a processor would likely have a higher clock rate (current members of the 5000 Series can be clocked as high as 160 MIPS) and more memory (say 64 KB instead of 32 KB).

Both the second processor as well as a faster/bigger 5402 would consume additional power as well as adding cost.

This section will describe one approach of how a MU WLAN adapter can be arranged for various hardware host interfaces using the 5402. It assumes that enough of the upper level MAC functions have been offloaded to a host processor so that only the 5402 is required on the PLAN adapter. A second processor could be added to any of the solutions outlined below.

In all of the following solutions, it is assumed that the runtime code for the 5402 is loaded from an external source (such as computer 22) via the host interface 32. This eliminates the need for flash memory on the adapter card, saving several dollars in the process. It should be pointed out that the 5402 comes with 8 KB of mask programmable ROM and a bootloader program (required for the USB and Ethernet host interfaces) would be placed in it. The bootloader would be smart enough to download the runtime code instructions over whatever serial interface was available.

The simplest interface of all would be for a host to use the Host Port on the 5402. This port operates as a dual port interface into the memory within the 5402. It would not be a standard interface but would be quite suitable for dedicated systems. Using it, computer 22 can read/write memory on a random or sequential basis. It is an 8 bit interface and can operate as fast as 160 Mbits/sec. When operated in random access mode, the computer 22 generates a 16 bit address using two writes to the port and then performs either a read or write operation. Such a mode allows a host to set up command blocks and the like within the memory of the 5402. Sequential mode allows a host to transfer data in and out of the 5402 memory very quickly (160 Mbits/sec). This would be used for transferring data.

If this approach was used, the only digital component on the WLAN adapter would be the 5402.

In the system of FIG. 1, the cell controller 14 is a board level personal computer coupled to the switching hub 12 preferably by 10 M bit and 100 Mb Ethernet ports. For smaller systems a 350 MHz Pentium computer with 16 MB RAM may be used. For larger systems having many RF ports a 500 MHz Pentium with 64 MB RAM is appropriate. Communications to and from the wired network are preferably carried out at 100 MHz. Communications to and from RF ports may be carried out at 10 MHz. A second cell controller may be supplied for larger systems and/or to provide backup in the event one cell controller fails. Reliability can be enhanced by providing dual fans and dual power supplies. A flash disk memory may be used for reliability. Alternately, the cell controller 14 may be built into the switching hub 12 or into a host processor.

The operating system for the cell controller 14 may be a real time operating system, such as VRTX or QNX, which provides multitasking, a full network stack and utilities. Web based management utilities, which are client side java based, are provided for maintaining the configuration of the cell controller 14, the RF ports 18 and status of the mobile units 20.

The cell controller 14 includes applications to provide mobile unit association management, roaming and packet buffer management. These applications are similar to those performed by current access points in the Spectrum 24 system. The cell controller 14 may also provide QoS support, user authorization and configuration management. Placing these functions on a personal computer cell controller facilitates system management and program updates using available programming tools. Further, modifications to authorization or management functions need only be installed into the cell controller 14, and no modification to the software of the RF ports 18 is required.

The cell controllers 14 handle routing of all messages to or from the mobile unit. The cell controller buffers message packets received from the wired network and determines the appropriate RF port 18 with which the addressed mobile unit 20 is associated and sends the packet to the RF port 18. The cell controller 14 can additionally perform WEP encryption/decryption and the CAC associated therewith.

The cell controller 14 may also the additional function of maintaining and downloading firmware to the RF ports 18. Upon power up the RF ports 18 use a bootloader routine stored in ROM to send a download request to cell controller 14. The cell controller then downloads firmware to the RF port 18, including configuration information such as channel assignment, ESS and BSS identification. The cell controller 14 and RF ports 18 additionally share a common TSF clock.

The mobile unit computer 22 of mobile unit 20 is provided with similar software to perform the higher level MAC functions as outlined above. Advantageously, the software 34 can be programmed using the same operating system as provided for the computer, and thereby provide a user interface, such as Windows, which is familiar to the user. The mobile unit software 34 provides the MAC functions of header building, roaming and association. The mobile unit computer 22 may also download firmware to the processor in the WLAN adapter 24.

As evident from the forgoing description, the hardware for RF port 18 and WLAN adapter 24 of mobile unit 20 can be substantially similar, with the possible exception of the interface to an Ethernet network or to a mobile unit host. Further, the logical cell controller function and the higher order MAC functions performed by the mobile unit host processor can be performed on any computer system.

Using the RF port 18 of the present invention coupled to a computer system, it is possible to provide either a mobile unit or a wireless network according to the software provided. Since the software for RF port 18 may be downloaded from a host system a simple combination of a computer and one or more RF ports can function as either a WLAN mobile unit as a WLAN host or both, by providing function selectable firmware to the processor in the RF port.

Figure 5:
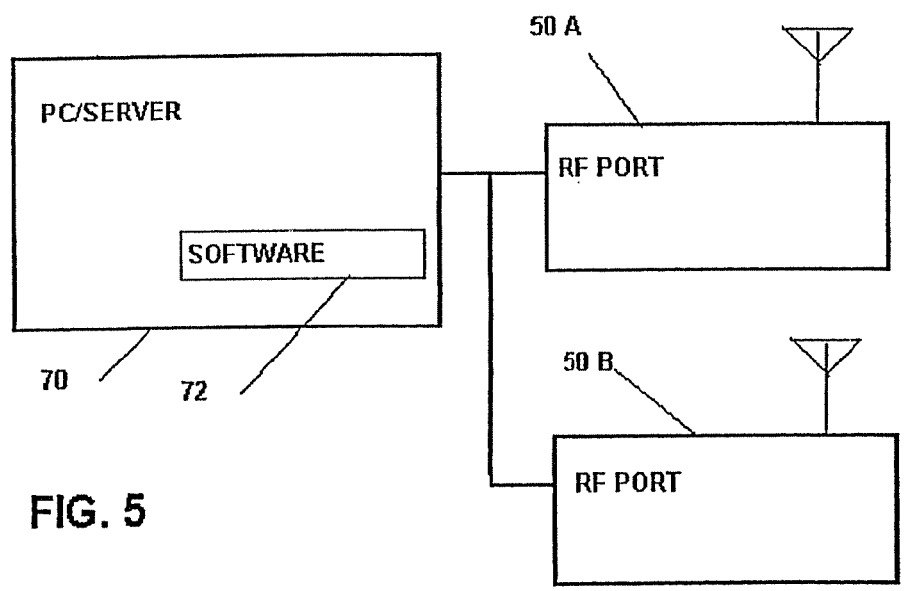
FIG. 5 is a block diagram of an arrangement of a computer and RF port for providing a simplified wireless local area network according to the present invention.

In the arrangement shown in FIG. 5, a personal computer 70 is provided with software 72 and connected to one or more RF ports 50A, 50B to provide a complete host system for wireless data communications. This arrangement could be used, for example, in a small business wherein office equipment is connected to server 70 by a wired network for conventional LAN operation and one or more RF ports 50 are also connected to server 70 on the LAN system to provide data communications between the server 70 and mobile units. The server can perform the higher order MAC functions and download firmware instructions to the RF ports. Alternatively, the firmware instructions can be installed on PROM memory in the RF ports.

Figure 6:
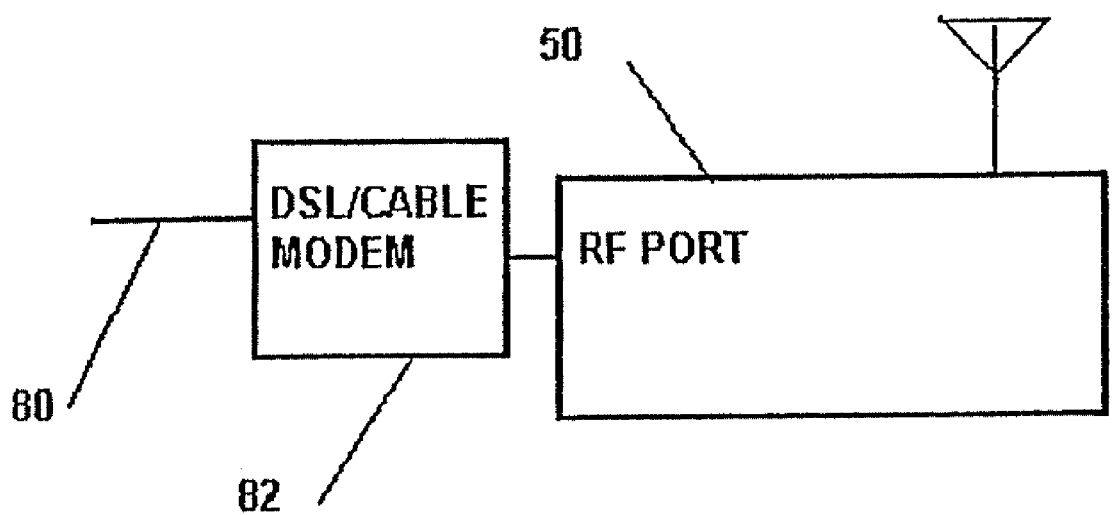
FIG. 6 is a block diagram of an arrangement for providing wireless access to the Internet using the RF port of the present invention.

FIG. 6 shows an arrangement for providing wireless access to the Internet using the RF port 50 of the present invention. Internet access over communications line 80 to modem 82 may be provided by cable, DSL or fiber optical transmission. RF port 50 may be provided with MAC firmware on PROM or may be configured with a bootloader program to download firmware from an ISP server. When installed in a home or office, mobile units 20 can associate with RF port 50 to initiate Internet access. The ISP server may perform the higher level MAC function, or they may be provided in RF port 50.

The mobile units 20 may be the personal computers 22 in a home or office with a WLAN adapter 24 as shown in FIG. 2.

Figure 7:
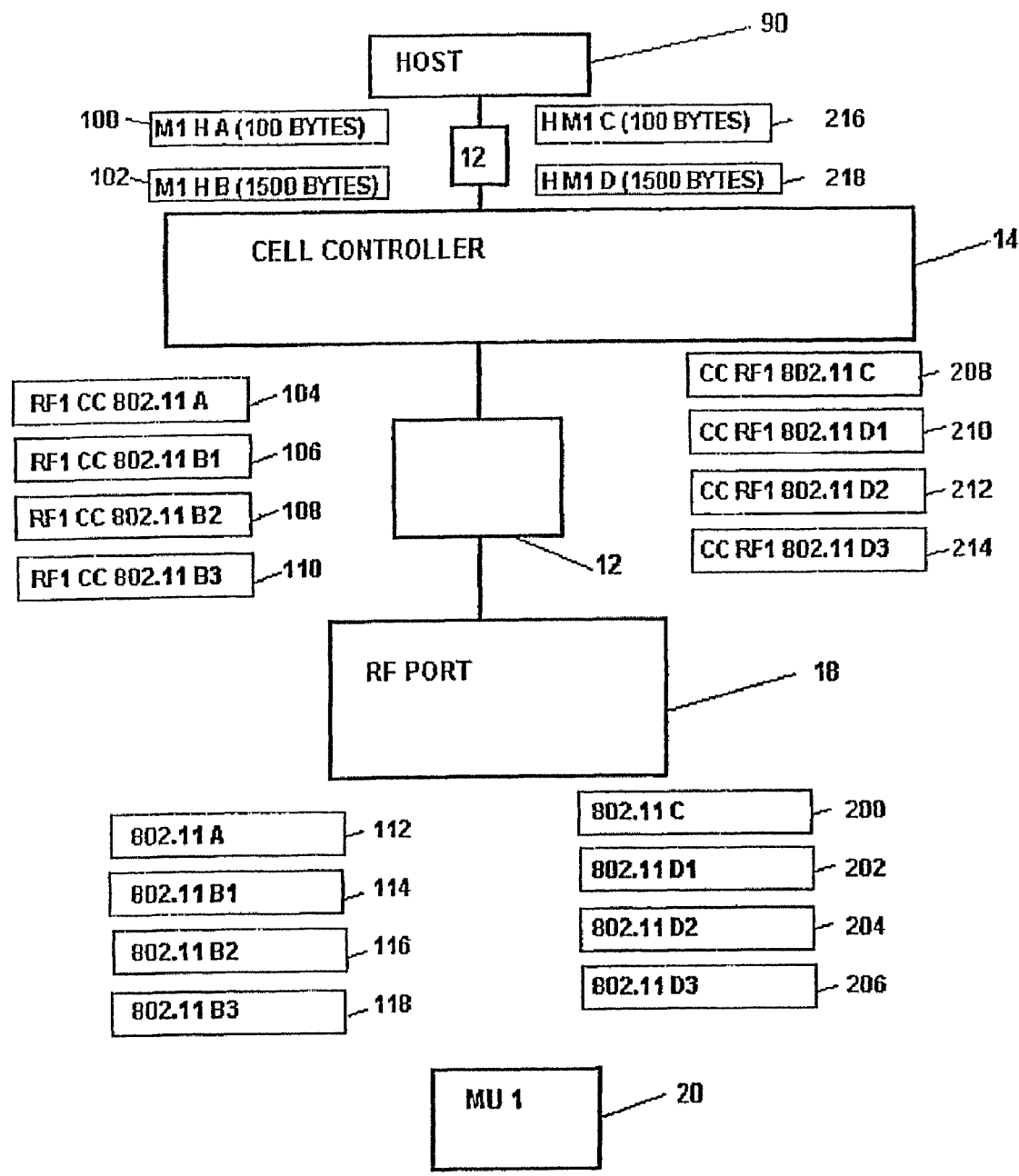
FIG. 7 is a diagram showing signal format according to one embodiment of the invention.

FIG. 7 illustrates an example of communications formats that might be used in the various system embodiments of the present invention. The FIG. 7 example assumes that the configuration includes a host 90 connected to a dedicated cell controller 14, which is likewise connected to RF port 18. It should be clearly understood that the logical cell controller functions may be performed in host 90, particularly in a simple system.

In the FIG. 7 example host 90 sends message "A" having 100 data bytes via an Ethernet packet 100 to cell controller 14. Packet 100 has a destination address of the Mobile unit (M1), a source address of the host (H) and includes data (A). Cell controller 14 formats the data in 802.11 format with the destination corresponding to mobile unit (MU1) 20. The cell encapsulates this 802.11 packet with data A into an Ethernet packet 104 addressed to RF port 1 (RF1) from the cell controller (CC).

RF port 18 receives the Ethernet packet 104 from cell controller 14 and generates and sends an RF packet 112 in 802.11 format to mobile unit 20, including data A. It should be understood that 802.11 header generation can be provided at either the cell controller 14 or the RF port 18, but packet 104 must include mobile unit identification data either as an 802.11 header or otherwise to enable RF port 18 to generate the header. RF port 18 additionally performs the CRC computation and adds the result to the 802.11 packet 112.

A second message "B" having 1500 bytes of data is also shown as originating as Ethernet packet 102 from host 90 to cell controller 14. Cell controller fragments data message B into three fragments B1, B2 and B3 to accommodate the 500 byte data limit of 802.11 packets. These three fragments are sent as Ethernet packets 106, 108, 110 to RF port 18, which transmits RF signal packets 114, 116, 118 to mobile unit 20.

Reverse communication is similar. Message C has 100 bytes and is sent by mobile unit 20 to RF port 18 as 802.11 RF signal packet 200. RF port 18 encapsulates this message into Ethernet packet 208 and sends it to cell controller 14, which extracts the destination information and data to provide Ethernet message 216 to the host 90. A larger message D is sent as message fragments 202, 204, 206 to RF ports 18, relayed as Ethernet packets 210, 212, 214 to cell controller 14 and sent as a reassembled Ethernet packet 218 to host 90.

Figure 8:
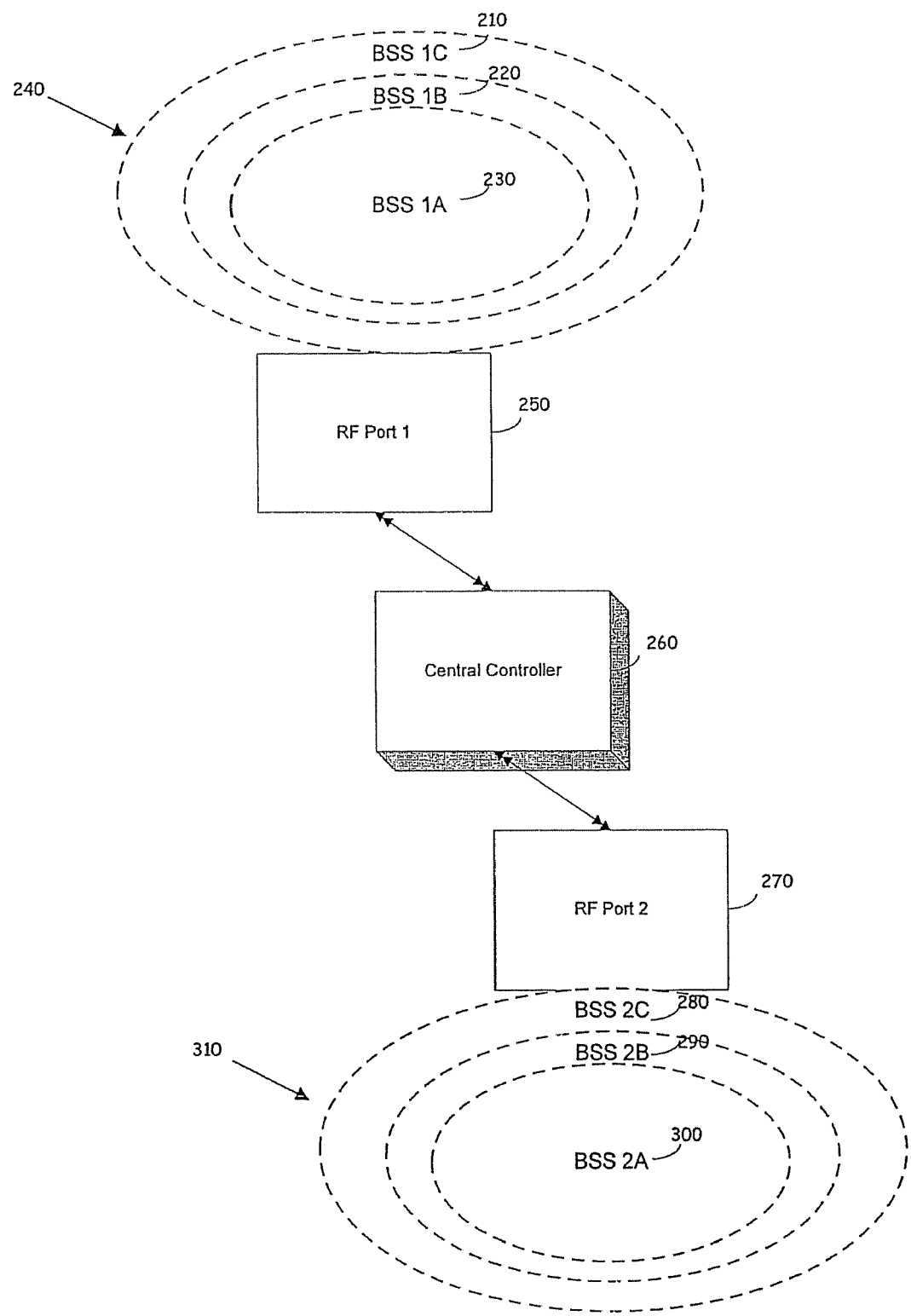
FIG. 8 is a diagram showing a compilation of RF ports having multiple ESS arrangements for providing overlapping, multiple wireless networks.

Referring now to FIG. 8, shown is an application of the central controller/RF port model that may be used to set multiple overlapping ESS LANs for use in the same or overlapping physical space. Shown in FIG. 8 is a central controller 260 which is associated with two RF ports, RF port 1 250 and RF port 2 270. The central controller 260 may be associated with more than two RF ports, but two are shown for illustration purposes. Each RF port 250, 270 provides coverage for a wireless LAN in the physical areas 240, 310.

FIG. 8 further illustrates the concept of providing multiple ESS identifications through the same RF port and cell controller such that each ESS identification is associated with a separate virtual wireless local area network having its own policies and security. Thus, RF port 1 250 may be configured so as to support separate BSS networks 1A 230, 1B 220 and 1C 210, all of which occupy the same physical space 240. The RF port may support more than three BSS networks, but three are shown for illustration purposes. Similarly, RF port 2 270 may be configured so as to support BSS networks 2A 300, 2B 290 and 2C 280. all of which occupy the same physical space 310. Using the configuration as shown in FIG. 8, multiple ESS LANs may be coordinated by the central controller 260 in the physical space 240 and 310. ESS A consists of BSS 1A 230 and BSS 2A 300. ESS B consists of BSS 1B 220 and 2B 290. ESS C consists of BSS 1C 210 and 2C 280.

As discussed in further detail above the RF ports 250, 270 preferably performs only functions of the access point that require a lower level of processing resources in terms of processor capacity and software complexity (memory requirement), and which are time critical. Other functions that are more processor intensive and require more complex programming, and which are not time critical, are relegated to one or more cell controllers 260, which may perform these more complex functions for a plurality of RF ports 250, 270. In the case illustrated in FIG. 8, the central controller handles the necessary processing of multiple ESS LANs A, B, C in the same physical space 240 and 310.

One application of multiple ESS LANs may be found on a public place, such as an airport where, for example, three levels of wireless networks may operate. A first public network level with generally open access to a wireless local area network that might provide, for example, public wireless telephone or internet access. A second network level would involve airport operations, such as luggage handling, aircraft servicing, etc. A third network level may be reserved for emergencies and security. Devices using the network can be restricted by the cell controller as to which virtual network they can access using the same RF port of the wireless network system. The cell controller would thereby control communications between mobile units accessing an RF port and the three or more virtual networks such that, for example, a member of the public using a publicly available device could only access the public functions of the system and therefore only have access to the lowest level of virtual wireless network. Other personnel, such as airport employees, may have access to the public level and also have access to the airport operational network. The security-based network would be available for select airport personnel such as management and security officers.

The cell controller performs the function of determining which ESS network a mobile unit communicating with an RF port associated with the cell controller is operating on, and thereby controls the direction of communication from the cell controller to the network. The cell controller can verify the multiple levels of security provided in connection with the access by the mobile unit devices, and in addition can prioritize communications so that higher priority communications such as security communications are given greater access to the system during higher traffic conditions. For example, in the three-tier embodiment discussed above, the security network could have a feature to disallow all other network access in an emergency situation.

A similar multi-virtual LAN network may be also useful in a health care facility wherein different networks are used for security, medical care, personal and public information.

While there has been described what is believed to be claimed in the above-identified application those skilled in the art will recognize that other and further modifications may be made without departing from the scope of the invention and it is intended to claim all such changes and modifications as fall within the true scope of the invention.

What is claimed is:

1. A Radio Frequency (RF) port adapted for a wireless communication system and for use with a cell controller which performs a second plurality of functions of a wireless communication standard protocol and that is at least partially housed in a first housing, comprising:
   a second housing that is physically separate and spatially remote from said first housing, and is removeably coupled to the first housing via an Ethernet cable;
   a RF receiver housed in said second housing, said RF receiver adapted to receive a first RF signal of a first Wireless Local Area Network (WLAN) having a first coverage area and adapted to receive a second RF signal of a second WLAN having a second coverage area that at least partially overlaps said first coverage area, wherein the first WLAN and the second WLAN are accessible at the same time; and
   a processor housed in said second housing, said processor receptive of said first RF signal and said second RF signal from said RF receiver and adapted to perform a first plurality of functions of the a wireless communication standard protocol without performing the second plurality of functions of the wireless communication standard protocol during at least one an operational mode to produce a first data signal from said first RF signal and a second data signal from said second RF signal;
   wherein the first plurality of functions and the second plurality of functions each include at least one media access control (MAC) function of the wireless communication standard protocol.

2. The RF port of claim 1, wherein said wireless communication standard protocol is an Institute of Electrical and Electronics Engineers (IEEE) 802.11 standard protocol.

3. The RF port of claim 1, wherein said at least one media access control function includes a non-time-critical media access control function.

4. The RF port of claim 3, wherein said second plurality of functions includes a cyclic redundancy check function.

5. The RF port of claim 3, wherein said second plurality of functions includes a network activity vector function.

6. The RF port of claim 3, wherein said second plurality of functions includes a ready to send/clear to send function.

7. The RF port of claim 3, wherein said second plurality of functions includes a header generation/parsing function.

8. The RF port of claim 3, wherein said second plurality of functions includes a collision avoidance function.

9. The RF port of claim 3, wherein said second plurality of functions includes a frequency hopping function.

10. The RF port of claim 3, wherein said second plurality of functions includes an ack parsing/generating function.

11. The RF port of claim 3, wherein said second plurality of functions includes a retransmission timeout function.

12. The RF port of claim 3, wherein said first plurality of functions includes a retransmission function.

13. The RF port of claim 3, wherein said first plurality of functions includes a rate control function.

14. The RF port of claim 3, wherein said first plurality of functions includes a host interface function.

15. A Radio Frequency (RF) port adapted for a wireless communication system and for use with a cell controller which performs a second plurality of functions of a wireless communication standard protocol and that is at least partially housed in a first housing, comprising:
   housing means for defining a second housing that is physically separate and spatially remote from said first housing, and is removeably coupled to the first housing via an Ethernet cable;
   receiving means housed in said housing means for receiving a first RF signal and a second RF signal, said first RF signal of a first Wireless Local Area Network (WLAN) having a first coverage area and said second RF signal of a second WLAN having a second coverage area that at least partially overlaps said first coverage area, wherein the first WLAN and the second WLAN are accessible at the same time; and
   processing means housed in said housing means for processing said first RF signal and said second RF signal, said processing means adapted to receive said first RF signal and said second RF signal from the receiving means and to perform a first plurality of functions of the wireless communication standard protocol without performing the second plurality of functions of the wireless communication standard protocol during an operational mode to produce a first data signal from said first RF signal and a second data signal from said second RF signal, wherein the first plurality of functions and the second plurality of functions each include at least one media access control (MAC) function of the wireless communication standard protocol.

16. The RF port of claim 15, wherein said wireless communication standard protocol is an Institute of Electrical and Electronics Engineers (IEEE) 802.11 standard protocol.

17. The RF port of claim 15, wherein said first plurality of functions includes at least one time-critical MAC function.

18. The RF port of claim 17, wherein at least one of said time-critical MAC functions is a cyclic redundancy check function.

19. The RF port of claim 17, wherein at least one of said time-critical MAC functions is a network activity vector function.

20. The RF port of claim 17, wherein at least one of said time-critical MAC functions is a ready to send/clear to send function.

21. The RF port of claim 17, wherein at least one of said lower level time-critical MAC functions is a header generation/parsing function.

22. The RF port of claim 17, wherein at least one of said time-critical MAC functions is a collision avoidance function.

23. The RF port of claim 17, wherein at least one of said time-critical MAC functions is a frequency hopping function.

24. The RF port of claim 17, wherein at least one of said time-critical MAC functions is an ack parsing/generating function.

25. The RF port of claim 17, wherein at least one of said time-critical MAC functions is a retransmission timeout function.

26. The RF port of claim 15, wherein said second plurality of functions includes at least one non-time-critical MAC function.

27. The RF port of claim 26, wherein at least one of said non-time-critical MAC functions is an association processing function.

28. The RF port of claim 26, wherein at least one of said non-time-critical MAC functions is a roaming function.

29. The RF port of claim 26, wherein at least one of said non-time-critical MAC functions is a retransmission function.

30. The RF port of claim 26, wherein at least one of said non-time-critical MAC functions is a rate control function.

31. The RF port of claim 26, wherein at least one of said non-time-critical MAC functions is a host interface function.

32. A method of operating a Radio Frequency (RF) port that is at least partially housed in a first housing, adapted for a wireless communication system, and for use with a cell controller which performs a second plurality of functions of a wireless communication standard protocol and that is at least partially housed in a second housing physically separate and spatially remote from said first housing and is removeably coupled to the first housing via an Ethernet cable, comprising the steps of:
receiving a first RF signal of a first Wireless Local Area Network (WLAN) having a first coverage area while receiving a second RF signal of a second WLAN having a second coverage area that at least partially overlaps said first coverage area, wherein the first WLAN and the second WLAN are accessible at the same time;
performing a first plurality of functions of the wireless communication standard protocol to produce a first data signal from said first RF signal and to produce a second data signal from said second RF signal without performing the second plurality of functions of the wireless communication standard protocol during an operational mode, wherein the first plurality of functions and the second plurality of functions each include at least one media access control (MAC) function of the wireless communication standard protocol.

33. The method of claim 32, wherein said wireless communication standard protocol is an Institute of Electrical and Electronics Engineers (IEEE) 802.11 standard protocol.

34. The method of claim 32, wherein said first plurality of functions include at least one time-critical MAC function.

35. The method of claim 34, wherein at least one of said time-critical MAC functions is a cyclic redundancy check function.

36. The method of claim 34, wherein at least one of said time-critical MAC functions is a network activity vector function.

37. The method of claim 34, wherein at least one of said time-critical MAC functions is a ready to send/clear to send function.

38. The method of claim 34, wherein at least one of said time-critical MAC functions is a header generation/parsing function.

39. The method of claim 34, wherein at least one of said time-critical MAC functions is a collision avoidance function.

40. The method of claim 34, wherein at least one of said time-critical MAC functions is a frequency hopping function.

41. The method of claim 34, wherein at least one of said time-critical MAC functions is an ack parsing/generating function.

42. The method of claim 34, wherein at least one of said time-critical MAC functions is a retransmission timeout function.

43. The method of claim 32, wherein said second plurality of functions include at least one non-time-critical MAC function.

44. The method of claim 43, wherein at least one of said non-time-critical MAC functions is a retransmission function.

45. The method of claim 43, wherein at least one of said non-time-critical MAC functions is a rate control function.

46. The method of claim 43, wherein at least one of said non-time-critical MAC functions is a host interface function.

* * * * *

UNITED STATES PATENT AND TRADEMARK OFFICE
CERTIFICATE OF CORRECTION

PATENT NO. : 8,391,256 B2  Page 1 of 1
APPLICATION NO. : 11/622074
DATED : March 5, 2013
INVENTOR(S) : Beach It is certified that error appears in the above-identified patent and that said Letters Patent is hereby corrected as shown below:

On the Title Page, Item (57), under "ABSTRACT", in Column 2, Line 5, delete "capable" and insert -- capable of --, therefor.

In the Specification

In Column 8, Line 56, delete "RE port" and insert -- RF port --, therefor.

In Column 9, Line 36, delete "UJC5402/VC5402" and insert -- UC5402/VC5402 --, therefor.

In Column 9, Line 54, delete "PLL," and insert -- PLL --, therefor.

In Column 10, Line 7, delete "CONTROL," and insert -- CONTROL --, therefor.

In Column 11, Line 53, delete "CPIJ" and insert -- CPU --, therefor.

Signed and Sealed this
Fourth Day of November, 2014

Michelle K. Lee
*Deputy Director of the United States Patent and Trademark Office*